US011334056B2

(12) United States Patent
Sato et al.

(10) Patent No.: US 11,334,056 B2
(45) Date of Patent: May 17, 2022

(54) PRODUCTION SUPPORT SYSTEM, METHOD AND PRODUCT FOR MONITORING PRODUCTION QUALITY USING ADJUSTABLE ALLOWABLE RANGES

(71) Applicant: YOKOGAWA ELECTRIC CORPORATION, Tokyo (JP)

(72) Inventors: Keiji Sato, Musashino (JP); Noboru Wakiyama, Musashino (JP); Ryoichi Himono, Musashino (JP); Ichiro Tsubota, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 219 days.

(21) Appl. No.: 16/211,984

(22) Filed: Dec. 6, 2018

(65) Prior Publication Data

US 2019/0171194 A1  Jun. 6, 2019

(30) Foreign Application Priority Data

Dec. 6, 2017 (JP) .............................. JP2017-234419

(51) Int. Cl.
*G05B 23/02* (2006.01)
*G06Q 50/04* (2012.01)
(Continued)

(52) U.S. Cl.
CPC ... *G05B 19/41875* (2013.01); *G05B 23/0216* (2013.01); *G05B 23/0267* (2013.01);
(Continued)

(58) Field of Classification Search
CPC .......... G05B 19/41875; G05B 23/0216; G05B 23/0294; G05B 23/0267;
(Continued)

(56) References Cited

U.S. PATENT DOCUMENTS 4,467,279 A * 8/1984 MacCormack ...... G01R 31/346
324/105
7,660,642 B1 * 2/2010 Tuszynski ........ G05B 19/41875
700/97

(Continued)

FOREIGN PATENT DOCUMENTS

JP   H10260702 A    9/1998
JP   2016122440 A * 7/2016 ........... G05B 19/418
(Continued)

*Primary Examiner* — Kenneth M Lo
*Assistant Examiner* — Jonathan Michael Skrzycki
(74) *Attorney, Agent, or Firm* — Osha Bergman Watanabe & Burton LLP

(57) ABSTRACT

A method to be performed in a production support system configured to process a raw material and to produce a product. And the method includes: acquiring a plurality of element values relating to production elements of the product; determining whether the element values are within allowable ranges in which a quality of the product meets a predetermined allowed quality; resetting the allowable ranges of one or a plurality of other element values to the allowable ranges in which the quality of the product meets the predetermined allowed quality, upon determining that at least one element value exceeds the allowable range; and outputting information about the reset allowable ranges.

9 Claims, 14 Drawing Sheets

(51) Int. Cl.
*G06Q 10/06* (2012.01)
*G05B 19/418* (2006.01)
(52) U.S. Cl.
CPC ... *G05B 23/0294* (2013.01); *G06Q 10/06395* (2013.01); *G06Q 50/04* (2013.01)
(58) Field of Classification Search
CPC .......... G05B 2219/32203; G05B 2219/35507; G06Q 50/04; G06Q 10/06395
See application file for complete search history.

(56) References Cited

U.S. PATENT DOCUMENTS

| | | | | |
|---|---|---|---|---|
| 2004/0113912 A1* | 6/2004 | Brooks | .............. | G05B 23/0235 345/440 |
| 2007/0192060 A1* | 8/2007 | Yam | ................... | G05B 23/0221 702/181 |
| 2019/0164106 A1* | 5/2019 | Suzuki | ............. | G06Q 10/06398 |

FOREIGN PATENT DOCUMENTS

| | | | |
|---|---|---|---|
| JP | 2016122440 | A | 7/2016 |
| JP | 2016-177794 | A | 10/2016 |

\* cited by examiner

FIG. 3

| PRODUCTION ELEMENT | ITEM OF EACH ELEMENT | ALLOWABLE RANGE |
|---|---|---|
| RAW MATERIAL | VISCOSITY | 80~100 VI |
| | SPECIFIC GRAVITY | 0.8~0.9kg/m$^3$ |
| | BOILING POINT | 150~250°C |
| | SULFUR AMOUNT | 0.005~0.01% |
| PROCESS | TEMPERATURE | 10~20°C |
| | FLOW RATE | 150~250m$^3$/h |
| | PRESSURE | 0.1~0.5MPa |
| | CONCENTRATION | 3~5% |
| FACILITY | AMPLITUDE OF AXIAL VIBRATION OF PUMP | ≤ 10μm(0-p) |
| | FREQUENCY OF AXIAL VIBRATION OF PUMP | 15~25Hz |
| | VIBRATION AMPLITUDE OF DISCHARGE VENT | ≤ 12.5μm |
| | OVERALL HEAT TRANSFER COEFFICIENT OF HEAT EXCHANGER | ≥ 600W/m$^2$·K |
| | KINETIC VISCOSITY OF MINERAL OPERATING OIL | 90~110% |
| | ACCUMULATED NUMBER OF OPERATION TIMES OF COMPRESSOR | ≤ 10$^6$ |
| PERSON | WORK TIME | 50 TO 60 MIN |
| | NUMBER OF WORK TIMES | 7 TO 10 TIMES |
| | WORK PREPARATION TIME | 15 TO 20 MIN |
| | WORK TIME INTERVAL | 5 TO 10 MIN |

FIG. 15

| PRODUCTION ELEMENT | ITEM OF EACH ELEMENT | ALLOWABLE RANGE | ELEMENT VALUE (OBSERVED VALUE) | EVALUATION FOR EACH ELEMENT VALUE | EVALUATION FOR EACH PRODUCTION ELEMENT | COMPREHENSIVE EVALUATION |
|---|---|---|---|---|---|---|
| RAW MATERIAL | VISCOSITY | 80~100 VI | 75 | × | × | 75 POINTS |
|  | SPECIFIC GRAVITY | 0.8~0.9kg/m³ | 0.85 | ○ |  |  |
|  | BOILING POINT | 150~250°C | 200 | ○ |  |  |
|  | SULFUR AMOUNT | 0.005~0.01% | 0.006 | ○ |  |  |
| PROCESS | TEMPERATURE | 10~20°C | 15 | ○ | ○ |  |
|  | FLOW RATE | 150~250m³/h | 200 | ○ |  |  |
|  | PRESSURE | 0.1~0.5MPa | 0.3 | ○ |  |  |
|  | CONCENTRATION | 3~5% | 4 | ○ |  |  |
| FACILITY | AMPLITUDE OF AXIAL VIBRATION OF PUMP | ≤10μm(0-p) | 7 | ○ | ○ |  |
|  | FREQUENCY OF AXIAL VIBRATION OF PUMP | 15~25Hz | 18 | ○ |  |  |
|  | VIBRATION AMPLITUDE OF DISCHARGE VENT | ≤12.5μm | 8 | ○ |  |  |
|  | OVERALL HEAT TRANSFER COEFFICIENT OF HEAT EXCHANGER | ≥600W/m²·K | 650 | ○ |  |  |
|  | KINETIC VISCOSITY OF MINERAL OPERATING OIL | 90~110% | 104 | ○ |  |  |
|  | ACCUMULATED NUMBER OF OPERATION TIMES OF COMPRESSOR | ≤10⁶ | 7.8×10⁵ | ○ |  |  |
| PERSON | WORK TIME | 50 TO 60 MIN | 55 | ○ | ○ |  |
|  | NUMBER OF WORK TIMES | 7 TO 10 TIMES | 8 | ○ |  |  |
|  | WORK PREPARATION TIME | 15 TO 20 MIN | 17 | ○ |  |  |
|  | WORK TIME INTERVAL | 5 TO 10 MIN | 6 | ○ |  |  |

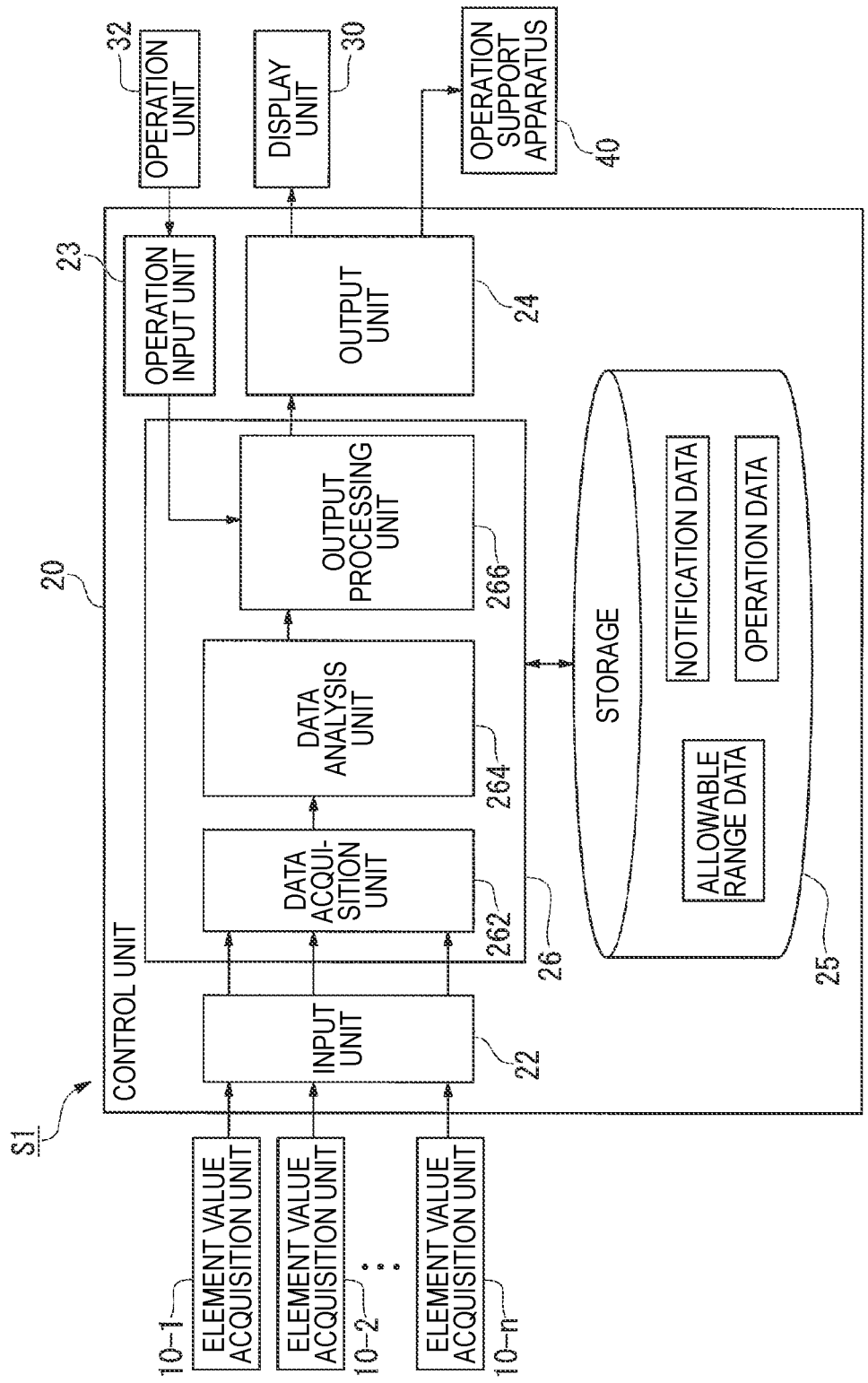

PRODUCTION SUPPORT SYSTEM, METHOD AND PRODUCT FOR MONITORING PRODUCTION QUALITY USING ADJUSTABLE ALLOWABLE RANGES

CROSS-REFERENCE TO RELATED APPLICATIONS

This application is based on and claims priority under 35 USC 119 from Japanese Patent Application No. 2017-234419 filed on Dec. 6, 2017, the contents of which are incorporated herein by reference.

TECHNICAL FIELD

The present disclosure relates to a production support system, a production support method and a program, and for example, relates to a production support system for supporting production of a product satisfying predetermined required quality characteristics.

BACKGROUND

In the related art, manufacturers have tried to mature technologies and to stabilize operations in long history. In the conventional production method, it is usually to set production conditions in advance for four elements of production on the basis of science technology and production technology established by research and development performed in a research institute and the like, in a planning phase, and to maintain the production conditions at a production site to thereby secure a quality of the product. The four elements of production indicate four elements that are bases of making things in the manufacturing industry, i.e., a raw material (Material), a facility (Machine), a process (Method) and a person (Man). The four elements may also be referred to as 4M.

In the conventional production method, in order to secure a predetermined quality, a product has been produced in compliance with preset conditions. The production conditions were set for each production element. Regarding the four elements of production, a raw material having a constant composition preset as the raw material, a process condition preset as the process, an operating condition preset as the facility, and a work condition preset as the person are respectively set.

More specifically, the raw material is usually composed by a plurality of raw material compositions for one product, and a predetermined allowable range is set for an element value indicating a characteristic of each raw material. For the facility, maintenance, and as required, repair and the like are performed to maintain the performance at the time when the setting was made. For the process, in order to maintain each of the operating conditions and process conditions, process control such as PID (Proportional-Integral-Differential) control has been executed. For the person, work contents performed for the facility and work conditions depending on characteristics of each person, countermeasures and the like are set. This is based on indications (tacit knowledge) including ambiguous expressions recognized by human, so that the production is performed under the work conditions of the individuals. Such techniques are disclosed in, for example, Japanese Patent Application Laid-Open Publication No. 2016-177794.

However, as the supply chain has been recently globalized, deviations of all conditions constituting the four elements of production considerably increase. Due to the deviations, cases where it is not possible to suppress an influence on the quality of the product in the conventional production method increase. For example, production regions of crude oil, which is a raw material of an ethylene plant, were limited to predetermined production regions in the past but have been spread around the world as the global economy has been developed. The compositions of the crude oil to be purveyed are different depending on the production regions of crude oil, so that the deviation of the compositions of the crude oil, which is a raw material, increases.

In this regard, it is more difficult for the manufacturer to balance the improvement on a PQCDS (Productivity, Quality, Cost, Delivery and Safety) index, which is one of management indexes of a business place such as a factory, and the control on the four elements of production so as to maintain and develop the business than ever before.

Also, when the deviation of even one element of the four elements of production, i.e., the considerable discrepancy of an element value thereof from the predetermined standard value occurs, it was not possible to evaluate the discrepancy in real time, in some cases. For this reason, even though the considerable discrepancy of even one element occurs, setting conditions originally set for the other elements may not be immediately changed and may be thus maintained in a production sequence. As a result, a product to be produced may not satisfy a predetermined quality. In other words, for the other elements, it is premised that the element value of one element is within the predetermined allowable range, without considering the deviation, i.e., the variation of the element value indicating the characteristics of the element.

On the other hand, a quality of a product to be finally produced with the four elements of production being balanced with each other may be secured. In other words, in the conventional production method, since the condition is individually set for each of the production elements, when the deviation occurs in even one element and the balance among the four elements is thus lost, the quality of the product may not satisfy the predetermined quality.

At the production site, information, which indicates countermeasure methods that are taken when the deviation occurs in the production element, i.e., when any one of the conditions does not satisfy the predetermined condition, is provided in diverse types. Some of the information is provided as explicit knowledge that can be explained or expressed by a sentence, a graph, an equation and the like. The other information is not explained by the sentence and the like and is just a tacit knowledge that is perceived by the operator's experience. Also, the on-site operator may be provided with only specific information (for example, information about the process) relating to only a job of each operator, in some cases. For this reason, when the deviation occurs in the production element, the countermeasure method may be selected under the determination of the on-site operator from the insufficient information, in some cases. For this reason, even when there is a countermeasure method for satisfying the predetermined quality, the appropriate countermeasure method may not be selected all the time. For example, if a cause due to which the quality of the product does not meet the predetermined quality and the countermeasure method thereof remain as only the tacit knowledge of the operator such as an operator of the production plant or if the cause and the countermeasure method are not systemized even though they are stored with being documented, they may not be sufficiently utilized even when an event causing the deviation in the production element and the lowering in the management index occurs.

One or more embodiments of the present invention provide a production support system, a production support method, and a program capable of supporting so that a quality of the product meets a predetermined quality when an element value indicative of a characteristic of a production element exceeds an allowable range in which the quality of the product meets the predetermined quality.

SUMMARY

A method relating to one aspect is to be performed in a production support system configured to process a raw material and to produce a product. And the method includes: acquiring a plurality of element values relating to production elements of the product; determining whether the element values are within allowable ranges in which a quality of the product meets a predetermined allowed quality; resetting the allowable ranges of one or a plurality of other element values to the allowable ranges in which the quality of the product meets the predetermined quality, when it is determined that at least one element value exceeds the allowable range; and outputting information about the reset allowable ranges.

BRIEF DESCRIPTION OF DRAWINGS

FIG. 3 is a table showing item examples of production elements according to one or more embodiments of the present invention.

FIG. 15 illustrates a calculation example of a quality index value according to one or more embodiments of the present invention.

FIG. 19 is a block diagram depicting another configuration example of the production support system according to one or more embodiments of the present invention.

DETAILED DESCRIPTION

Hereinafter, embodiments of the production support system, the production support apparatus, the production support method and the program will be described with reference to the drawings.

Figure 1:
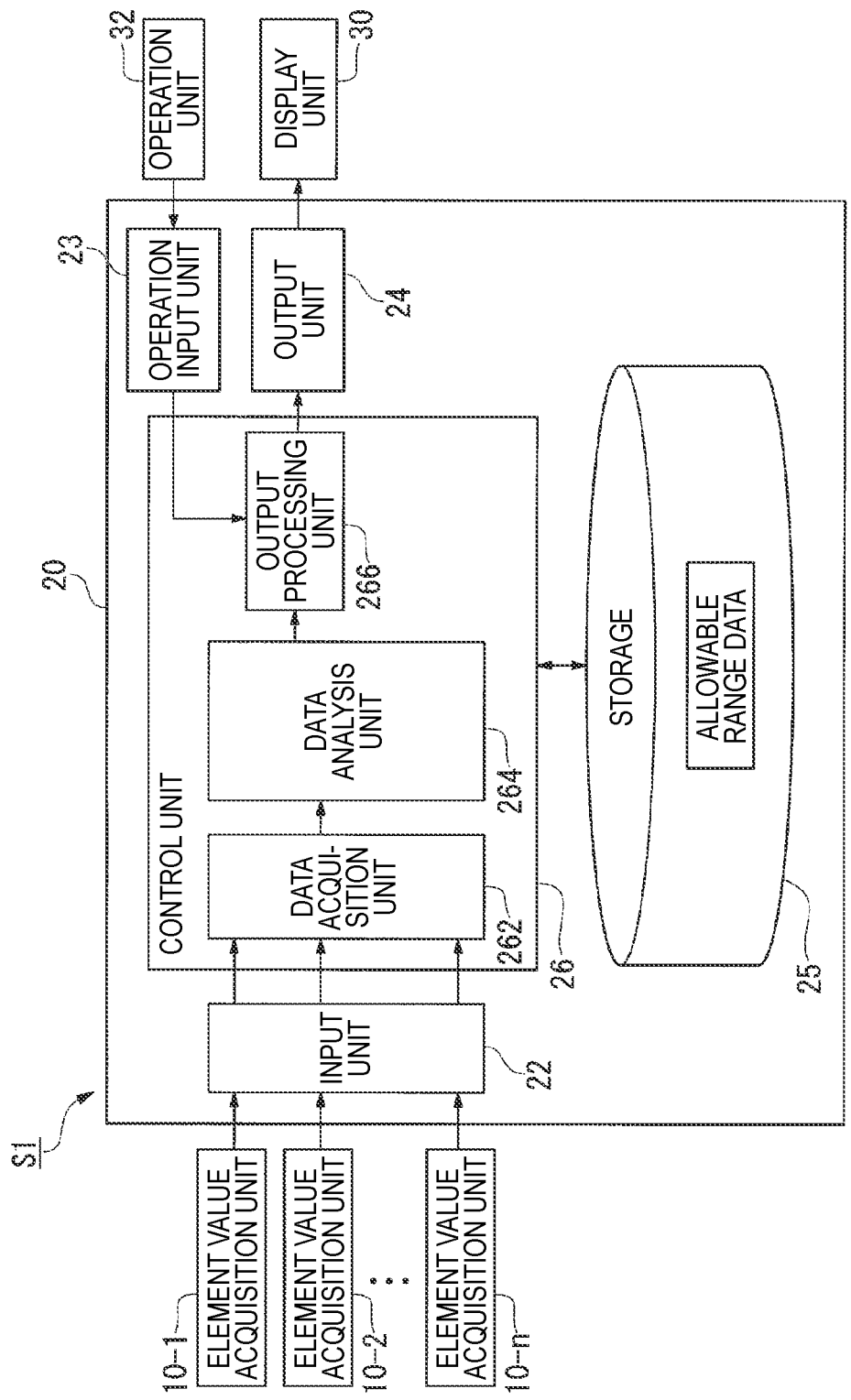
FIG. 1 is a block diagram depicting a configuration example of a production support system according to one or more embodiments of the present invention.

First, a configuration example of a production support system in accordance with one or more embodiments of the present invention is described. FIG. 1 is a block diagram depicting a configuration example of a production support system in accordance with one or more embodiments of the present invention.

A production support system S1 according to one or more embodiments of the present invention includes a plurality of element value acquisition units 10, a production support apparatus 20, a display unit 30, and an operation unit 32. In the example of FIG. 1, the number of the element value acquisition units 10 is n (n: integer of 2 or greater). The n element value acquisition units 10 are respectively referred to as the element value acquisition unit 10-1 and the like for distinction.

The element value acquisition units 10-1 to 10-$n$ are configured to respectively acquire element values of different items. The element value is a value indicative of a characteristic of a production element of a product, which is a production target. The element value acquisition units 10-1 to 10-$n$ are devices such as a sensor, a measuring instrument, a calculation device, an information processing device and the like for acquiring the element values. The element value acquisition unit 10-1 is a specific gravity meter, for example. The specific gravity meter is configured to measure a specific gravity of a raw material, as the element value of the raw material. The element value acquisition unit 10-2 is a temperature sensor, for example. The temperature sensor is configured to measure a temperature of a production facility in which a process is to be implemented, as the element value of the process. The element value acquisition unit 10-3 is a controller (control device) for controlling an operation of the production facility, for example. The element value acquisition unit 10-3 may be configured to acquire operating time (for example, time that is necessary for temperature rising) of the controller, as an example of the element value of the process. The element value acquisition unit 10-3 is configured to acquire operating environments, an operating history (for example, the accumulated operating time the facility, the number of operation times of a valve configuring the facility, a revolution of a motor) and the like of the production facility (for example, weather, an operating load situation and the like), from the production facility, as the element value of the production facility. The element value acquisition unit 10-4 is an operation terminal device, for example. The operation terminal device is configured to receive an operation input of an operator, and to save an operation history formed by accumulating operation information indicative of the received operation input. The operation terminal device is configured to analyze the saved operation history to thereby deduce a work time of the operator within an observation time period, as the element value. The examples of the element value will be described later.

Each of the element value acquisition units 10-1 to 10-n is configured to generate element value data indicative of the acquired element value and to output the generated element value data to the control unit 26.

The element value data is input to the production support apparatus 20 from each of the element value acquisition units 10-1 to 10-n. The production support apparatus 20 is configured to determine whether the element value indicated by the input element value data is within an allowable range. The allowable range means a range of an element value in which a quality of a product to be produced meets a predetermined allowable quality. The allowable range is defined by an upper limit and a lower limit, for example. When it is determined that at least one element value exceeds the allowable range, the production support apparatus 20 resets the allowable ranges of other element values to the allowable ranges in which the quality of the product meets the predetermined quality. The production support apparatus 20 is configured to output display data for displaying information of the reset allowable ranges to the display unit 30. The display data is data for expressing a display screen for showing the upper limit and the lower limit of the element value after resetting, for example. Examples of the display screen will be described later.

The production support apparatus 20 may be configured as a general-purpose personal computer, a work station, a dedicated professional-use portable terminal device (tablet), an operation terminal device, an operation support apparatus and the like, for example.

The display unit 30 is configured to visually display the diverse information to be input from the production support apparatus 20. The display unit 30 is a display such as an LCD (Liquid Crystal Display), an OELD (Organic Electro Luminescence Display) and the like.

The operation unit 32 is configured to receive a user's operation and to generate an operation signal corresponding to the received operation. The operation unit 32 is configured to output the generated operation signal to the production support apparatus 20. The operation unit 32 may include a general-purpose member such as a mouse, a keyboard, a touch sensor and the like or may include a dedicated member such as a button, a lever, a knob and the like, for example. The production support apparatus 20 is configured to control an operation, in correspondence to the operation signal input from the operation unit 32. The production support apparatus 20 is configured to specify a production element to be designated by the operation signal and to output, to the display unit 30, display data for expressing information of the allowable range of the element value relating to the specified production element, for example.

Subsequently, an example of the functional configuration of the production support apparatus 20 in accordance with one or more embodiments of the present invention is described.

The production support apparatus 20 includes an input unit 22, an operation input unit 23, an output unit 24, a storage 25, and a control unit 26.

The input unit 22 is configured to output the element value data, which are to be input from the element value acquisition units 10-1 to 10-n, to the control unit 26.

The operation input unit 23 is configured to output the operation signal, which is to be input from the operation unit 32, to the control unit 26.

The output unit 24 is configured to output display data, which is to be input from the control unit 26, to the display unit 30.

The input unit 22 and the operation input unit 23 are input interfaces, respectively. The output unit 24 is an output interface. The operation input unit 23 may be configured as a single input/output interface integrated with the output unit 24.

In the storage 25, a variety of data such as data that is to be used for processing that is to be executed by the control unit 26, data acquired by the control unit 26 and the like are stored. The storage 25 includes a storage medium such as an HDD (Hard Disc Drive), a flash memory, an EEPROM (Electrically Erasable Programmable Read Only Memory), a ROM (Read Only Memory), a RAM (Random Access Memory) and the like. Examples of the data that is to be stored in the storage 25 will be described together with functions of the control unit 26.

The control unit 26 is configured to control diverse functions of the production support apparatus 20. The control unit 26 includes a calculation device such as a CPU (Central Processing Unit), for example. The control unit 26 may be configured to implement some or all of functions of the respective units to be described later by reading out a control program stored in advance in the storage 25 and executing processing instructed with diverse commands described in the control program. According to one or more embodiments of the present invention to be described later, execution of the processing instructed with the described command may be simply referred to as "execution". Also, start of "execution" may be simply referred to as "activation."

The control unit 26 includes a data acquisition unit 262, a data analysis unit 264, and an output processing unit 266.

The data acquisition unit 262 is configured to acquire the element value data from each of the element value acquisition units 10-1 to 10-n via the input unit 22. The data acquisition unit 262 is configured to sample the element value data of n items, as analysis targets. Upon the sampling, the data acquisition unit 262 is configured to aggregate the latest element value data of the n items acquired every predetermined time period (for example, 1 to 10 minutes) for one production facility, as one set of element value data. Therefore, the element value data of the n items aggregated every time period are sampled as the analysis targets. The data acquisition unit 262 is configured to output the one set of aggregated element value data to the data analysis unit 264.

In the meantime, the unit of the sampling is not limited to the time and may be a lot, which is a unit of the production facility and the process management. In below descriptions, an example where a unit of the sampling is time will be described. The unit of the sampling is referred to as "sample" and the time at which the sampling is executed is referred to as "sampling time".

The data analysis unit 264 is configured to refer to the allowable range data stored in the storage 25 and to determine whether the n element values indicated by the element value data input from the data acquisition unit 262 are within the predetermined allowable ranges. The allowable range is a range of the element value in which the quality of the product meets the predetermined allowable quality, and is set for each item of the element value. In the storage 25, an initial value of the allowable range for each item, and allowable range data indicative of a parameter for calculating (which will be described later) the allowable range for each item are stored in advance. The allowable range is specified by the upper limit and the lower limit of the element value of the item, for example.

When it is determined that even the element value of at least one item exceeds the allowable range, the data analysis unit 264 resets the allowable ranges of the element values of the other items determined to be within the allowable ranges to the allowable ranges in which the quality of the product meets the predetermined quality. Here, the data analysis unit 264 may change (reset) the allowable range of even the element value determined to exceed the allowable range in which the quality of the product meets the predetermined quality so that the element value is to be within the allowable range. In below descriptions, the item of which the element value exceeds the allowable range may be referred to as "abnormal item" and the items of the element values other than the abnormal item may be referred to as "other items". Also, the element value exceeding the allowable range may be referred to as "abnormal value" and the element value within the allowable range may be referred to as "normal value". The data analysis unit 264 is configured to calculate the reset allowable ranges of the other items by using the parameter indicated by the allowable range data stored in the storage 25 and the element value of the abnormal item, in accordance with a predetermined function (empirical equation). By the resetting, the allowable range of at least one other item may be changed. The data analysis unit 264 is configured to output allowable range data, which indicates the calculated allowable ranges of the other items, to the output processing unit 266. The calculation example of the allowable range will be described later.

In the meantime, the data analysis unit 264 may be configured to update the allowable range indicated by allowable range data stored in the storage 25 to the allowable range changed by the resetting whenever resetting the allowable range. Thereby, in the storage 25, the allowable range data indicative of the latest allowable range at that point in time is maintained. The data analysis unit 264 may be configured to output the element value data, which indicates the element value of the item that does not exceed the allowable range, to the output processing unit 266 and to output the allowable range data indicative of the allowable range thereof at that point in time.

The output processing unit 266 is configured to convert the information of the allowable range, which is indicated by the allowable range data input from the data analysis unit 264, into display data for display. The output processing unit 266 is configured to generate display data showing the upper limit and the lower limit, as the allowable range for each item, for example. The output processing unit 266 is configured to output the generated display data to the display unit 30. The display unit 30 is configured to display a display screen for displaying the allowable range for each item, based on the display data input from the output processing unit 266.

In the meantime, the output processing unit 266 may be configured to determine an item of a production element of which the allowable range is to be displayed, based on an operation signal to be input from the operation unit 32 via the operation input unit 23 in association with a manual input. Also, the output processing unit 266 may be configured to generate display data indicative of the allowable range and the element value of the determined item. Display examples of the allowable range will be described later.

(Production Element)

Figure 2:
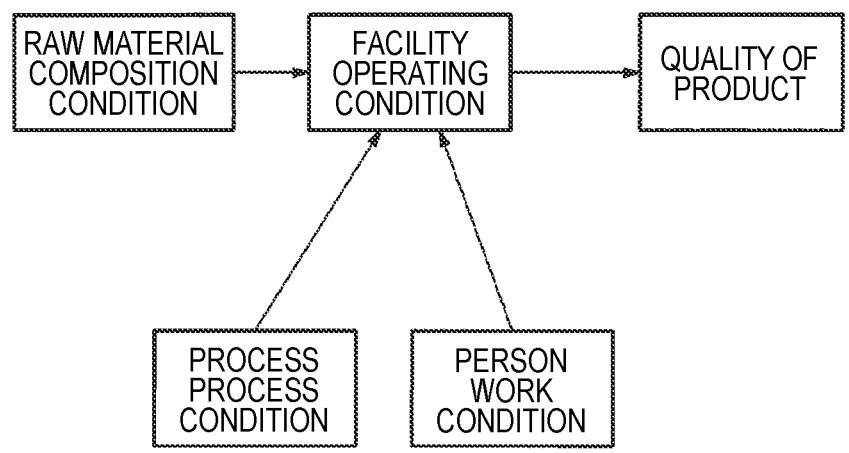
FIG. 2 depicts an example of a production model.

Examples of the production element according to one or more embodiments of the present invention are described. The production element is an element that has an influence on a quality of a product. As exemplified in FIG. 2, the production element is classified into four elements of a raw material, a process, a facility and a person. "Raw material" indicates a material that is a basis of a product. Items of "raw material" include an item indicative of a composition condition of the raw material, for example. "Process" indicates a production process, i.e., a sequence of advancing production of a product. Items of "process" include an item indicative of a condition of a process to be performed in a production facility, for example. "Facility" indicates a production facility, i.e., an instrument, an apparatus and the like that are to be used for production. Items of "facility" include an item indicative of an operating condition, for example. "Person" indicates the production manpower, i.e., the manpower relating to the production or a work condition of a work that is to be performed by the production manpower. Items of "person" include an item indicative of the work condition.

According to one or more embodiments of the present invention, since a difference between an element value of any one item of the items relating to the production element and a predetermined standard value becomes prominent, the element value is allowed to exceed a predetermined allowable range. The production support system S1 according to one or more embodiments of the present invention has a function for supporting for a producer or a person who monitors the production to ensure that the quality of the product meets the predetermined allowed quality even though an element value of any one item exceeds the predetermined allowable range.

Subsequently, examples of the items of the production elements are described. FIG. 3 is a table showing item examples of the production elements according to one or more embodiments of the present invention. FIG. 3 exemplifies allowable ranges of respective items of the production elements in an ethylene plant at that point in time. In FIG. 3, a first column, a second column and a third column indicate the production element, the item of each element and the allowable range of the item. The items of the production element "raw material" include "viscosity", "specific gravity", "boiling point" and "sulfur amount", which are attributes of the crude oil becoming the raw material of ethylene, which is a product. The viscosity, the specific gravity, the boiling point and the sulfur amount are sequentially measured by measuring instruments, which are mounted to an inlet part of a raw material into the ethylene plant, which is a production facility, as the element value acquisition units 10.

The items of the production element "process" include "temperature" in a distiller, which is configured to perform a water cooling process, which is one of processes of producing ethylene from the crude oil, and "flow rate", "pressure" and "concentration" of the raw material. "Temperature", "flow rate", "pressure" and "concentration" are sequentially measured by measuring instruments, which are mounted to a distiller of the ethylene plant, which is a production facility, as the element value acquisition units 10.

The items of the production element "facility" include an amplitude of axial vibration of a pump, which is a production facility, a frequency of axial vibration of the pump, a vibration amplitude of a discharge vent, an overall heat transfer coefficient of a heat exchanger, a kinetic viscosity of mineral operating oil, and the accumulated number of operation times of a compressor. Meanwhile, in below descriptions, the amplitude of axial vibration of the pump, the frequency of axial vibration of the pump, the vibration amplitude of the discharge vent, the overall heat transfer coefficient of the heat exchanger, the kinetic viscosity of the mineral operating oil, and the accumulated number of operation times of the compressor may be simply referred to as "amplitude of axial vibration", "frequency of axial vibration", "vibration amplitude", "overall heat transfer coefficient", "kinetic viscosity" and "accumulated number of operation times".

"Amplitude of axial vibration" and "frequency of axial vibration" are acquired by a controller (not shown) as the element value acquisition unit 10 configured to analyze amplitude values of the pump at each time, for example. (0-p) annexed to a unit [μm] of "amplitude of axial vibration" indicates a peak value of an amplitude from a predetermined reference position. The controller is configured to acquire, as the amplitude value of the pump, an amplitude value caused due to vibrations of a rotary shaft detected by a vibration sensor mounted to the pump. "Vibration amplitude" is acquired by the controller as the element value acquisition unit 10 configured to analyze amplitude values of the discharge vent at each time, for example. The controller is configured to acquire, as the amplitude value of the discharge vent, an amplitude value caused due to vibrations detected by a vibration sensor mounted to the discharge vent. The upper limit 12.5 [μm] exemplified in FIG. 3 corresponds to 2.5 times of the initial value 5.0 [μm]. "Overall heat transfer coefficient" is an index value indicative of heat transferability from a first target, which is a heat exchange source, to a second target, which is a heat exchange destination. "Overall heat transfer coefficient" is calculated by the controller as the element value acquisition unit 10 on the basis of a first temperature difference between an inlet temperature of ethylene to the heat exchanger and an inlet temperature of cooling water, a second temperature difference between an outlet temperature of ethylene and an outlet temperature of the cooling water, and a heat-transfer area and an exchanged heat quantity of the heat exchanger. The controller can calculate the exchanged heat quantity from the flow rate, the inlet temperature and the outlet temperature of the cooling water and the flow rate, the inlet temperature and the outlet temperature of ethylene. The controller is configured to acquire the inlet temperature of the cooling water from a temperature sensor mounted to a piping configured to supply the cooling water to the heat exchanger and to acquire the outlet temperature and the flow rate of the cooling water from a temperature sensor and a flow rate sensor mounted to a piping configured to discharge the cooling water from the heat exchanger, for example. Also, the controller is configured to acquire the inlet temperature of ethylene from a temperature sensor mounted to a piping configured to supply ethylene to the heat exchanger and to acquire the outlet temperature and the flow rate of ethylene from a temperature sensor and a flow rate sensor mounted to a piping configured to discharge ethylene from the heat exchanger, for example. "Kinetic viscosity" is a kinetic viscosity of oil that is to be used for a machine such as a motor of the pump. "Kinetic viscosity" is acquired by the controller as the element value acquisition unit 10 configured to acquire a kinetic viscosity detected in a kinetic viscosity system mounted to a motor, for example. A value of "kinetic viscosity" exemplified in FIG. 3 is a value normalized on the basis of a reference value of a predetermined kinetic viscosity set to 100[%]. "Accumulated number of operation times" is an accumulated value of the number of operation times performed up to that point in time. "Accumulated number of operation times" is acquired by analyzing an operating history of a compressor, which is a control target, as the element value acquisition unit 10, for example.

The items of the production element "person" include work time of an operator in a predetermined observation time period, number of work times, work preparation time and work time interval. "Work time" and "number of work times" indicate time and number of times relating to monitoring, operation and the like of the production facility performed by the operator. "Work preparation time" indicates time consumed to prepare the work, mainly the engineering. "Work time interval" corresponds to time in which the operator does not perform work within the observation time period, i.e., an interval of work time zones temporally adjacent to each other. "Work time", "number of work times", "work preparation time" and "work time interval" are acquired by analyzing an operation history generated by an operation terminal device (not shown) as the element value acquisition unit 10, for example.

It cannot be said that "work time", "number of work times", "work preparation time" and "work time interval" can be sequentially acquired all the time every sampling time. Therefore, the data acquisition unit 262 may acquire, as the element values of the items, values instructed by an operation signal to be input from the operation unit 32 via the operation input unit 23 in correspondence to a manual input, i.e., a user's operation, or may use preset element values. In the meantime, in below descriptions, the description "instructed by an operation signal to be input from the operation unit 32 in correspondence to an operation" in association with a manual input may be simply referred to as "instructed by an operation."

Also, the operation terminal device may be configured to analyze an operation history in elapsed time after start of a predetermined observation time period until the corresponding point of time, thereby acquiring an element value of each item in the elapsed time. The operation terminal device may be configured to normalize the acquired element values by multiplying a ratio of the observation time period to the elapsed time and to predict an element value of each item at each sampling time. In the meantime, when the production support apparatus 20 has a function of the operation support apparatus or the operation terminal device, the production support apparatus may perform processing of calculating the element value of each item of "work time", "number of work times", "work preparation time" and "work time interval" from the acquired operation history. The operation history is formed as the operation information instructed by an operation is accumulated in the storage 25.

The allowable range is indicated by any one or both of the lower limit and the upper limit for each item, for example. More specifically, for "viscosity" that is an item belonging to the production element "raw material", 80[VI: Viscosity Index; viscosity coefficient] and 100[VI] are respectively noticed as examples of the lower limit and the upper limit. For "flow rate" that is an item belonging to the production element "process", 150 [m³/h] and 250 [m³/h] are respectively noticed as examples of the lower limit and the upper limit. In the meantime, the items include an item for which only the lower limit is set and the upper limit is not set and an item for which only the upper limit is set and the lower limit is not set. For example, for "amplitude of axial vibration" that is an item belonging to the production element "facility", 10 [µm] is noticed as the upper limit but the lower limit is not provided. Also, for "vibration amplitude", 12.5 [µm] is noticed as the upper limit but the lower limit is not provided.

FIG. 3 exemplifies a case where the number of elements of the production element is four types. However, the present invention is not limited thereto. The number of elements of the production element may be five or more types or three or fewer types. Also, the number of items of each production element is four types or six types. However, the number of items may be five or seven or more types or three or fewer types. Also, the product is not limited to the material such as ethylene, and may be an electronic device such as a portable phone, a tablet terminal device and the like, a stationery product such as a ballpoint pen, a note and the like, and apparel such as shirt, pants and the like. The product elements and items thereof may be different depending on types of the product. Also, each item may be handled as one production element. However, in below descriptions, the production elements and items thereof in an ethylene plant shown in FIG. 3 are exemplified for easy understanding.

(Display Example of Element Value and Allowable Range)

Subsequently, a display example of the element value and the allowable range is described.

FIGS. 4 to 8 depict display examples of the element value and the allowable range according to one or more embodiments of the present invention. When the element value data is acquired every predetermined time, the element value and the allowable range are displayed, so that a situation of the deviation of the element value at the latest point of time is sequentially notified to the user. In other words, it is possible to enable the user who monitors the production facility to correctly recognize the element value and the allowable range of each item. For this reason, even when an item of which the element value temporarily exceeds the allowable range occurs, a chance that the quality of the product meets the predetermined quality is obtained before shipment of the product.

Figure 4:
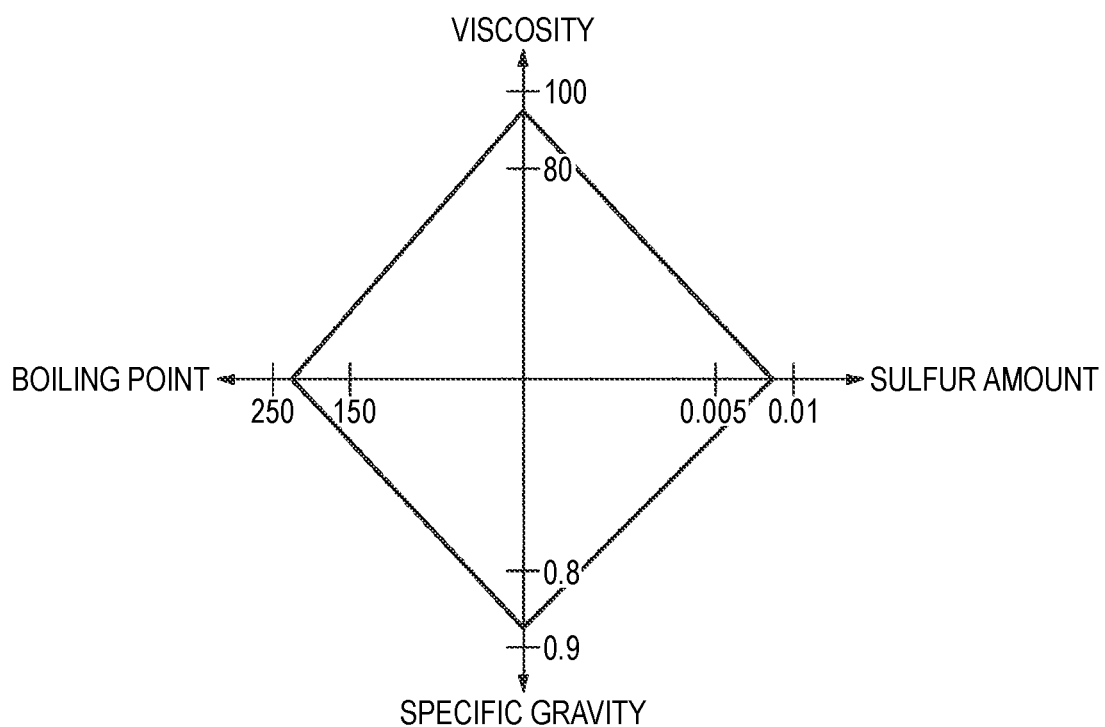
FIG. 4 depicts a display example (1) of element values and allowable ranges according to one or more embodiments of the present invention.

FIG. 4 depicts an example of a radar chart showing the element value, the lower limit and the upper limit of each item belonging to the production element "raw material". In the example of FIG. 4, the radar chart has four coordinate axes spaced by 90° in different directions from a center point. Each coordinate axis indicates the element value, the lower limit and the upper limit of one item. The larger the coordinate point indicative of the corresponding value is, the further the coordinate point is shown at a display position more distant from the center point. The apex points indicative of the respective element values are connected by line segments, and line segments intersecting with the coordinate axis of each item are displayed at the display positions of the lower limit and the upper limit.

By the display, it is notified that the element value, the lower limit and the upper limit of "viscosity" are respectively 92[VI], 80[VI] and 100[VI]. It is notified that the element value, the lower limit and the upper limit of "boiling point" are respectively 220[° C.], 150[° C.] and 250[° C.]. It is notified that the element value, the lower limit and the upper limit of "specific gravity" are respectively 0.82, 0.8 and 0.9. It is notified that the element value, the lower limit and the upper limit of "sulfur amount" are 0.007[%], 0.005 [%] and 0.01[%]. Accordingly, the user can perceive that the element values of "viscosity", "boiling point", "specific gravity" and "sulfur amount" are all within the allowable ranges.

Figure 5:
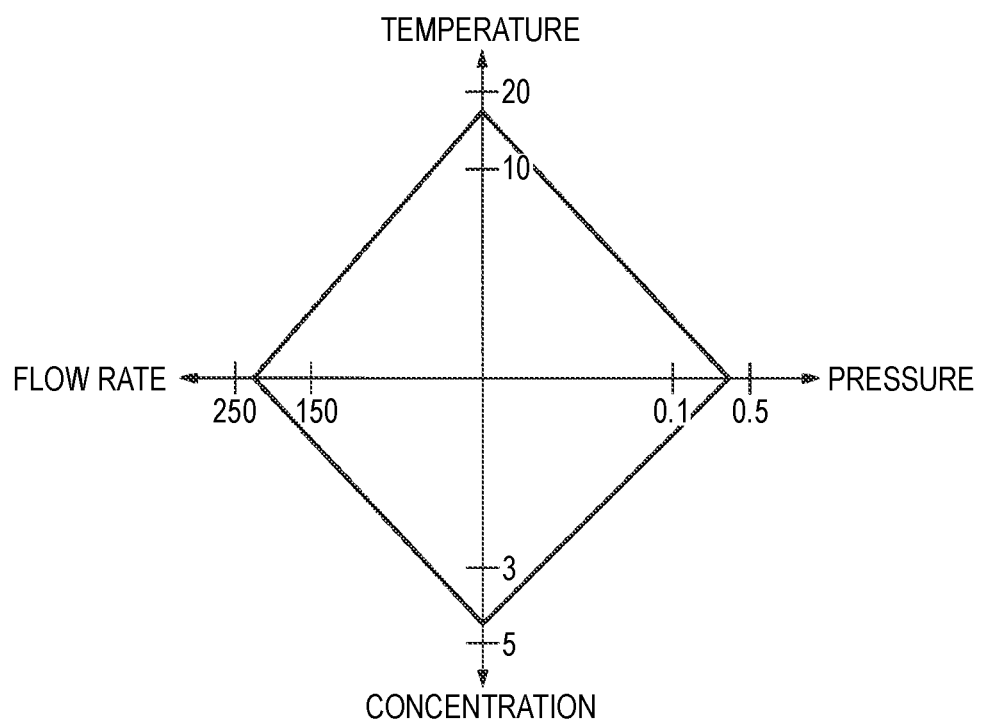
FIG. 5 depicts a display example (2) of the element values and allowable ranges according to one or more embodiments of the present invention.

FIG. 5 depicts an example of a radar chart showing the element value, the lower limit and the upper limit of each item belonging to the production element "process". In the example of FIG. 5, it is notified that the element value, the lower limit and the upper limit of "temperature" are respectively 17[° C.], 10[° C.] and 20[° C.]. It is notified that the element value, the lower limit and the upper limit of "flow rate" are respectively 150 [m$^3$/h], 220 [m$^3$/h] and 250 [m$^3$/h]. It is notified that the element value, the lower limit and the upper limit of "concentration" are respectively 4.2[%], 3[%] and 5[%]. It is notified that the element value, the lower limit and the upper limit of "pressure" are respectively 0.33 [MPa], 0.1 [MPa] and 0.5 [MPa]. Accordingly, the user can perceive that the element values of "temperature", "flow rate", "concentration" and "pressure" are all within the allowable ranges.

Figure 6:
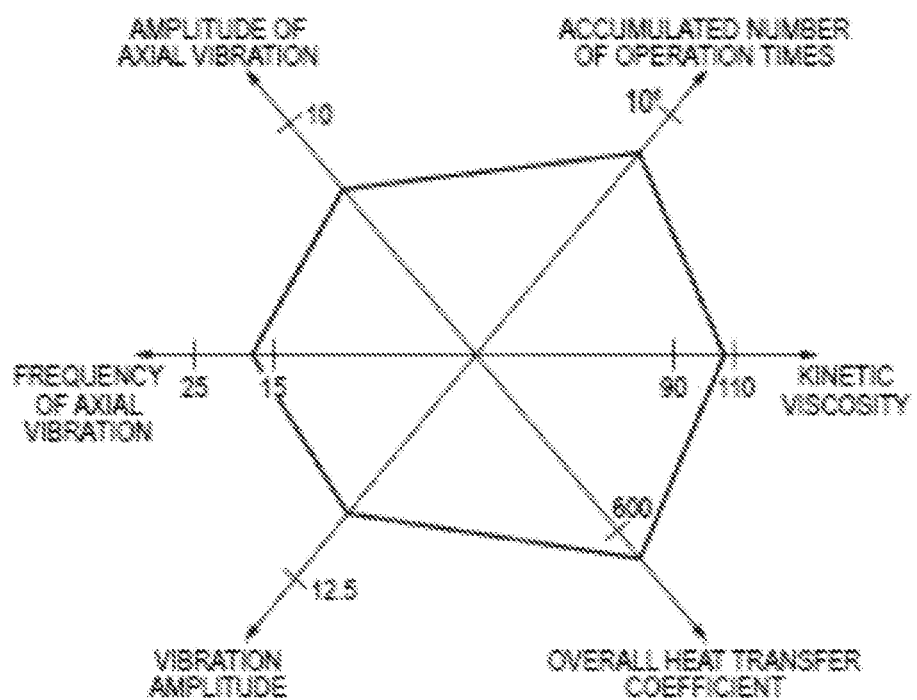
FIG. 6 depicts a display example (3) of the element values and allowable ranges according to one or more embodiments of the present invention.

FIG. 6 depicts an example of a radar chart showing the element value, the lower limit (only the corresponding item) and the upper limit (only the corresponding item) of each item belonging to the production element "facility". In the example of FIG. 6, it is notified that the element value and the upper limit of "amplitude of axial vibration" are respectively 7 [µm] and 10 [µm]. It is notified that the element value, the lower limit and the upper limit of "frequency of axial vibration" are respectively 18 [Hz], 15 [Hz] and 25 [Hz]. It is notified that the element value and the upper limit of "vibration amplitude" are respectively 8 [µm] and 12.5 [µm]. It is notified that the element value and the lower limit of "overall heat transfer coefficient" are respectively 650 [W/m$^2$/K] and 600 [W/m$^2$/K]. It is notified that the element value, the lower limit and the upper limit of "kinetic viscosity" are respectively 90[%], 104[%] and 110[%]. It is notified that the element value and the upper limit of "accumulated number of operation times" are respectively $7.8 \times 10^5$ and $10^6$. Accordingly, the user can perceive that the element values of "amplitude of axial vibration", "frequency of axial vibration", "vibration amplitude", "overall heat transfer coefficient", "kinetic viscosity" and "accumulated number of operation times" are all within the allowable ranges.

Figure 7:
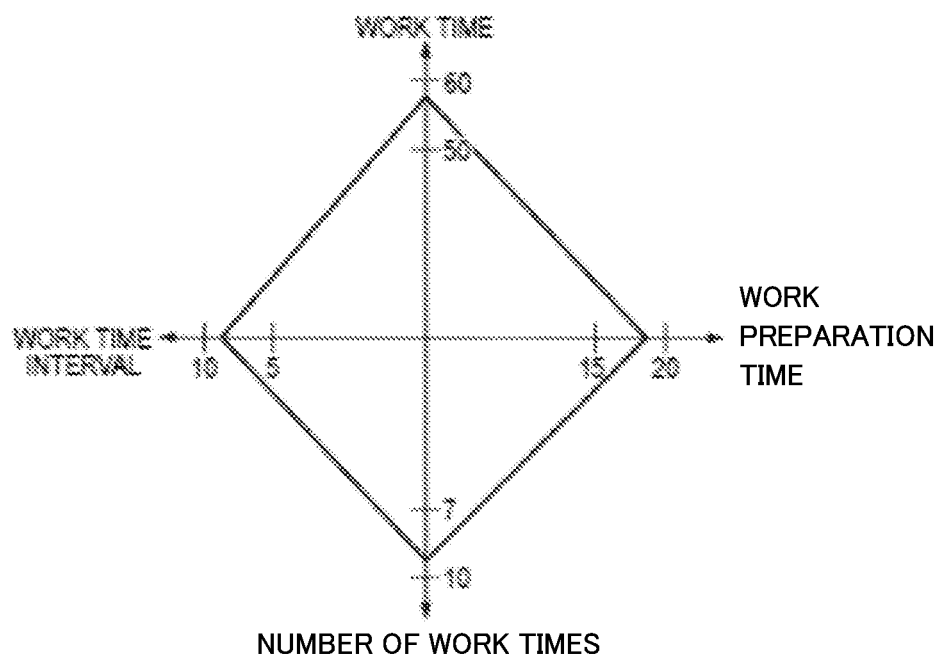
FIG. 7 depicts a display example (4) of the element values and allowable ranges according to one or more embodiments of the present invention.

FIG. 7 depicts an example of a radar chart showing the element value, the lower limit and the upper limit of each item belonging to the production element "person". In the example of FIG. 7, it is notified that the element value, the lower limit and the upper limit of "work time" are respectively 53 [min.], 50 [min.] and 60 [min.]. It is notified that the element value, the lower limit and the upper limit of "work time interval" are respectively 8.3 [min.], 5 [min.] and 10 [min.]. It is notified that the element value, the lower limit and the upper limit of "number of work times" are respectively 8[times], 7[times] and 9[times]. It is notified that the element value, the lower limit and the upper limit of "work preparation time" are respectively 18 [min.], 15 [min.] and 20 [min.]. Accordingly, the user can perceive that the element values of "work time", "work time interval", "number of work times" and "work preparation time" are all within the allowable ranges.

In order to display the display screen, a display template showing the radar chart indicative of the coordinate axes is stored in advance in the storage 25. The output processing unit 266 reads out the display template from the storage 25 and specifies the element value data and the allowable range data of the item of the production element instructed by an operation, from the latest element value data acquired up to this time and the allowable range data. The output processing unit 266 determines the respective display positions from the element value of the item indicated by the specified element value data and the lower limit and the upper limit of the item indicated by the allowable range data. The display position is on the coordinate axis corresponding to each item, and the larger the value thereof is, the larger the distance from the center point is. Then, the output processing unit 266 draws the line segments based on the display positions determined for the element values of the respective items, thereby generating the display data indicative of the radar chart. The output processing unit 266 outputs the generated display data to the display unit 30 via the output unit 24. Therefore, a relation between the acquired latest element value and allowable range of each item is sequentially notified every sampling time.

FIGS. 4 to 7 exemplify the acquired element value, as the element value of each item. However, the present invention is not limited thereto. Instead of the element value, a relative value based on a predetermined standard value may be displayed. When the element value of the item is larger than the predetermined standard value, for example, the data analysis unit 264 determines, as the relative value, a value obtained by subtracting 1 from a ratio of the element value to the standard value. On the other hand, when the element value of the item is smaller than the predetermined standard value, the data analysis unit 264 determines, as the relative value, a value obtained by subtracting 1 from a ratio of the standard value to the element value. Therefore, when the element value and the standard value are the same, the relative value becomes zero (0). When the element value is two times of the standard value and when the element value is 0.5 times of the standard value, the relative value becomes 100%. The allowable range may be indicated by a relative limit value. The relative limit value is a threshold value of the relative value becoming a basis as to whether the quality of the product meets the predetermined allowed quality. Also, the data analysis unit 264 may determine, as the standard value, an arithmetic mean value or a geometric mean value of the upper limit and the lower limit set at that point in time.

Figure 8:
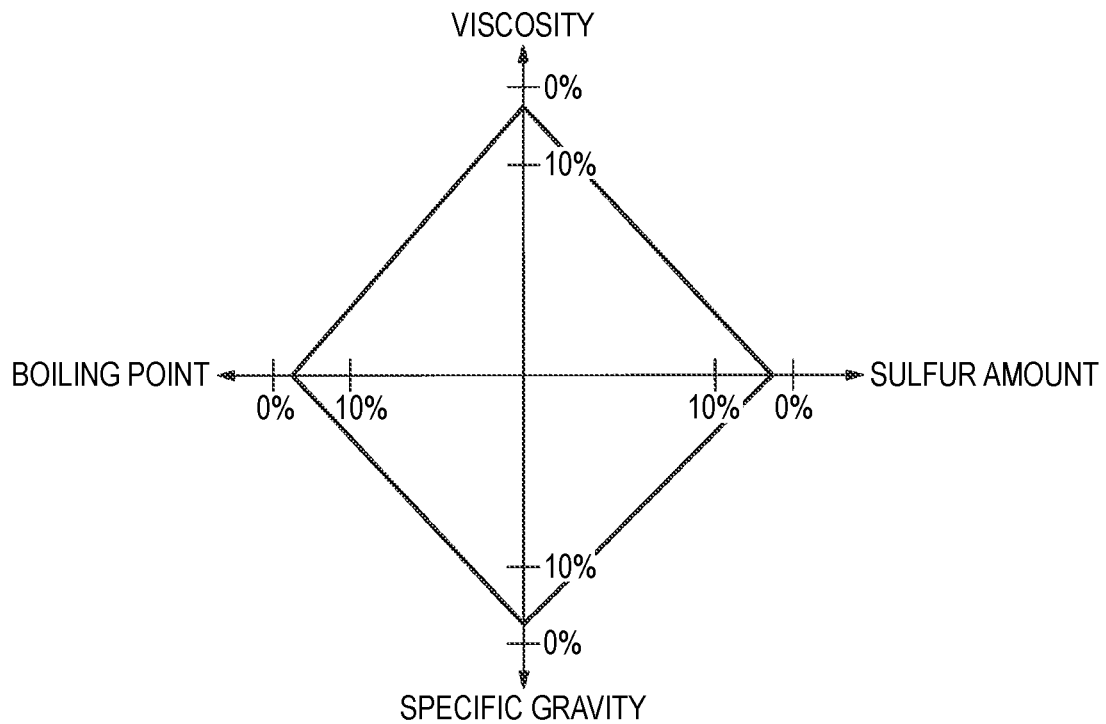
FIG. 8 depicts a display example (5) of the element values and allowable ranges according to one or more embodiments of the present invention.

FIG. 8 depicts an example of the radar chart showing the relative value and the relative limit value of each item belonging to the production element "raw material". In the example of FIG. 8, each coordinate axis indicates the relative value and the relative limit value of one item. The smaller the coordinate point indicative of the corresponding value is, the coordinate point is shown at a display position less distant from the center point. The apex points indicative of the respective relative values are connected by line segments, and line segments intersecting with the coordinate axis of each item are displayed at the display positions of 0% and the relative limit value. The relative value 0% is a relative value corresponding to the standard value.

By the display, it is notified that the relative value, which corresponds to the standard value, of each item is 0% and the relative limit value is 10%. Also, it is notified that the relative values of "viscosity", "boiling point", "specific gravity" and "sulfur amount" are respectively 3%, 2%, 2% and 3%. Accordingly, the user can perceive that the element values of "viscosity", "boiling point", "specific gravity" and "sulfur amount" are all within the allowable ranges.

In the meantime, the data analysis unit 264 may set, as the relative value, a value obtained by normalization of dividing an absolute value of the deviation of the element value of each item from the standard value by a standard deviation or a value range width. The data analysis unit 264 may calculate the standard deviation from the element values of each item collected for each sample in the past and may calculate, as the value range width, a difference between a minimum value and a maximum value that can be taken as the element value of each item.

In the meantime, when it is determined that the element value of at least one item exceeds the allowable range, the data analysis unit 264 may output abnormality notification information (alarm), which indicates that any one element value exceeds the allowable range, to the output processing unit 266. Therefore, the data analysis unit 264 may include abnormal item information, which indicates an abnormal item of which the element value exceeds the allowable range, in the abnormality notification information.

When the abnormality notification information is input from the data analysis unit 264, the output processing unit 266 may generate display data indicative of the abnormality notification information and output the generated display data to the display unit 30. The display unit 30 may display the abnormality notification information, which is included in the display data input from the output processing unit 266. The abnormality notification information may be expressed by a character, a symbol or a pattern indicative of the abnormality and may also be expressed by an aspect (for example, a color, brightness, blinking and the like) different from the other information. Also, the abnormality notification information to be displayed may include information of the abnormal item of which the element value exceeds the allowable range. Therefore, the user is urged to perform an action for ensuring that the quality of the product meets the predetermined quality.

(Resetting of Allowable Range)

Subsequently, an example of resetting of the allowable range is described. When the element value of at least one item exceeds the predetermined allowable range, the data analysis unit 264 resets the allowable ranges of the other items so that the quality of the product meets the predetermined quality. Also, the data analysis unit 264 resets the allowable range of the abnormal item so that the element value thereof is to be included therein. For example, while the data analysis unit 264 resets so that the allowable range of item 1 is to include the element value at that point in time, it resets the allowable range of each of items 2 to 4. Then, the output processing unit 266 outputs display data indicative of the reset allowable ranges to the display unit 30. When the element values of all items are within the predetermined allowable ranges, the data analysis unit 264 does not necessarily output the display data. When an abnormal item of which the element value exceeds the predetermined allowable range occurs, the display unit 30 displays a display screen indicating the reset allowable ranges. Therefore, when an abnormal item of which the element value exceeds the predetermined allowable range occurs, the user who sees the display unit 30 can recognize the allowable ranges reset for the other items and the situation where the element value of the abnormal item is within the reset allowable range. For this reason, the user is urged to perform an action for ensuring that the quality of the product meets the predetermined quality by adjusting the element values relating to the other items.

Figure 9:
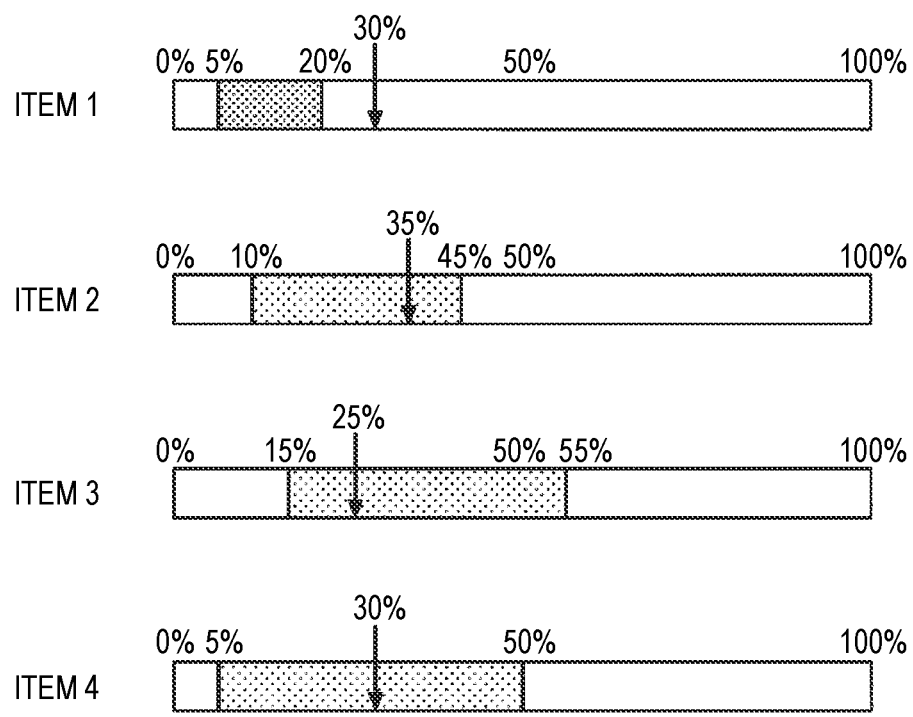
FIG. 9 depicts an example of the allowable range before resetting according to one or more embodiments of the present invention.
Figure 10:
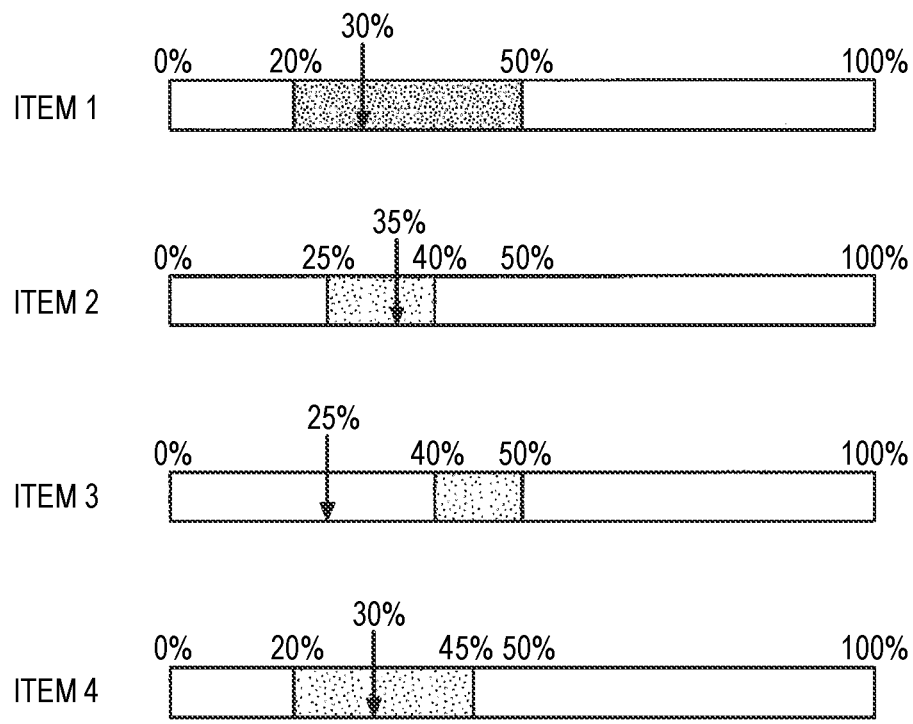
FIG. 10 depicts an example of the allowable range after resetting according to one or more embodiments of the present invention.

FIGS. 9 and 10 depict examples the allowable ranges before resetting and after resetting. The element value of each item is normalized by setting the maximum value and minimum value, which can be taken, to 100% and 0%.

In the example of FIG. 9, it is assumed that at any sample, the lower limit and the upper limit of item 1 are respectively 5% and 20%, the lower limit and the upper limit of item 2 are respectively 10% and 45%, the lower limit and the upper limit of item 3 are respectively 15% and 55% and the lower limit and the upper limit of item 4 are respectively 5% and 50%. During the observation time period, when the element values of item 1, item 2, item 3 and item 4 are respectively 30%, 35%, 25% and 30%, the data analysis unit 264 determines that the element values of item 2, item 3 and item 4 are respectively within the allowable ranges and the element value of item 1 exceeds the allowable range. Then, the data analysis unit 264 resets the allowable ranges of item 1 to item 4 by referring to the allowable range data, based on the element value of at least item 1.

In the example of FIG. 10, after resetting, the lower limit and the upper limit of item 1 are respectively 20% and 50%, the lower limit and the upper limit of item 2 are respectively 25% and 40%, the lower limit and the upper limit of item 3 are respectively 40% and 50% and the lower limit and the upper limit of item 4 are respectively 20% and 45%. Therefore, it is possible to enable the user to recognize that the quality of the product meets the predetermined quality when each element value is within the allowable range after resetting. According to the allowable ranges after resetting, the element values of item 1, item 2 and item 4 are respectively within the allowable ranges but the element value 25% of item 3 is below the allowable range 40% to 50%. Therefore, the output processing unit 266 displays a screen indicative of the allowable ranges after resetting on the display unit 30, thereby urging the user to perform an action for ensuring that the quality of the product meets the predetermined quality by adjusting the element value of item 3 to be included within the allowable range 40% to 50%.

(Display Example of Element Value)

Subsequently, a display example of the element value of the abnormal item is described. As exemplified in FIGS. 4 to 8, the output processing unit 266 sequentially displays the latest element value of each item at that point in time on the display unit 30. However, the output processing unit may display a display screen, in which the element value of the abnormal item exceeding the allowable range and the immediately previous element value within the allowable range are superimposed, on the display unit 30.

Figure 11:
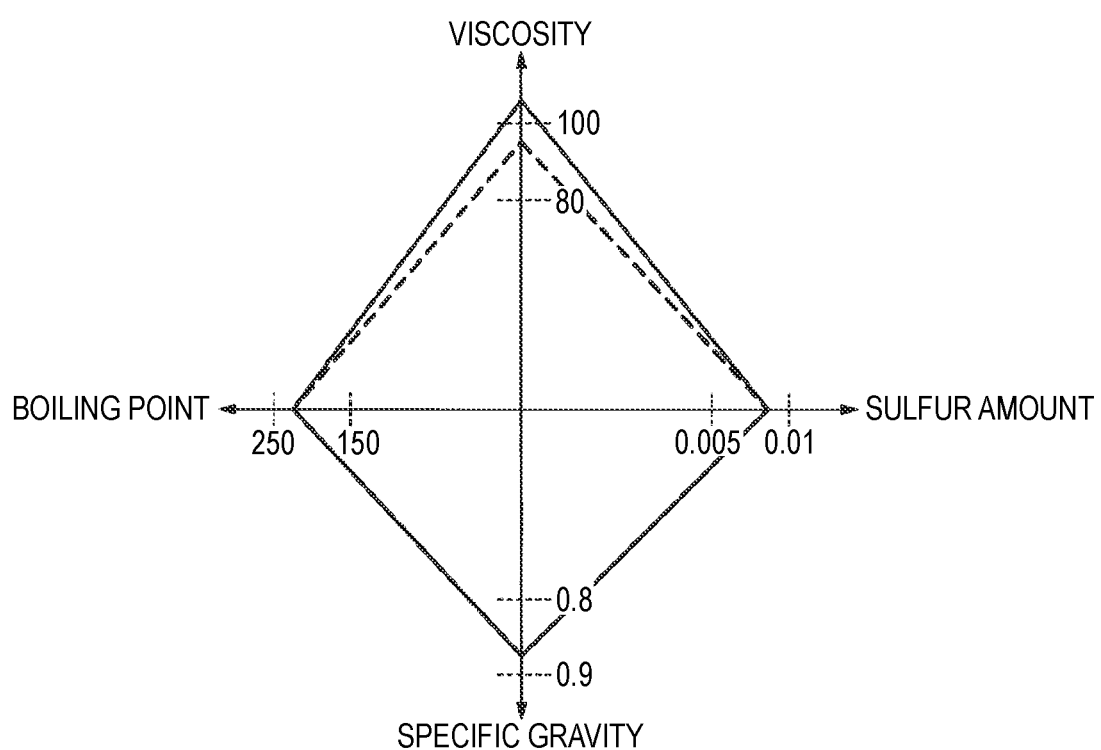
FIG. 11 depicts a display example (1) of the allowable ranges before and after resetting according to one or more embodiments of the present invention.

FIG. 11 depicts an example of the radar chart showing the element value of each item of the production element "raw material" before and after change. FIG. 11 shows an example where the element value of "viscosity" changes from 92[VI] to 105[VI] at any sampling time and the element values of the other items "boiling point", "specific gravity" and "sulfur amount" remain unchanged, respectively. The element value 105[VI] after change is greater than the upper limit[VI]. At this time, the output processing unit 266 generates display data for displaying the element value of each item at a sampling time, at which the element value of "viscosity" has exceeded the upper limit, and at a sampling time immediately before the corresponding sampling time. As shown in FIG. 11, the line segment between the apex points for indicating the latest element values and the line segment between the apex points for indicating the immediately previous element values may be shown in different aspects so as to express the change in the element value. Also, the latest element value may be expressed in such an aspect that a color, brightness, a line type and the like are more marked than the immediately previous element value. Thereby, it is possible to more clearly present the information indicating that the element value exceeds the allowable range. Also, like the examples of FIGS. 4 to 7, the line segments indicating the upper limit and the lower limit are shown on the coordinate axes corresponding to the respective items. Thereby, the user can easily perceive that the element value of "viscosity" has exceeded the upper limit. In the meantime, in the example of FIG. 11, the allowable ranges of "viscosity", "boiling point", "specific gravity" and "sulfur amount" remain unchanged.

Also, there are an item of which the element value can be directly controlled and an item of which the element value cannot be directly controlled, depending on the items of the element value. Therefore, the output processing unit 266 may generate display data in which the element value of the directly controllable item is to be expressed in a more marked aspect than the element value of the directly uncontrollable item and a display aspect of the element value of the directly uncontrollable item is made to be similar to the immediately previous element value.

(Display Example of Reset Allowable Range)

Subsequently, display examples of the reset allowable ranges of the other items are described. The output processing unit 266 may display a display screen, in which the allowable range immediately before resetting and the latest reset allowable range after resetting are superimposed, on the display unit 30.

Figure 12:
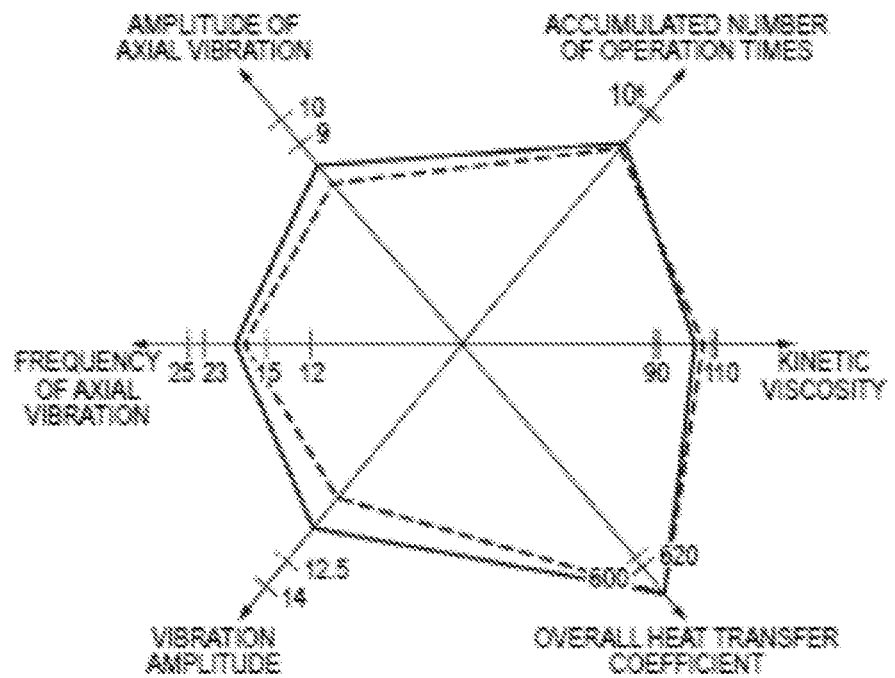
FIG. 12 depicts a display example (2) of the allowable ranges before and after resetting according to one or more embodiments of the present invention.
Figure 13:
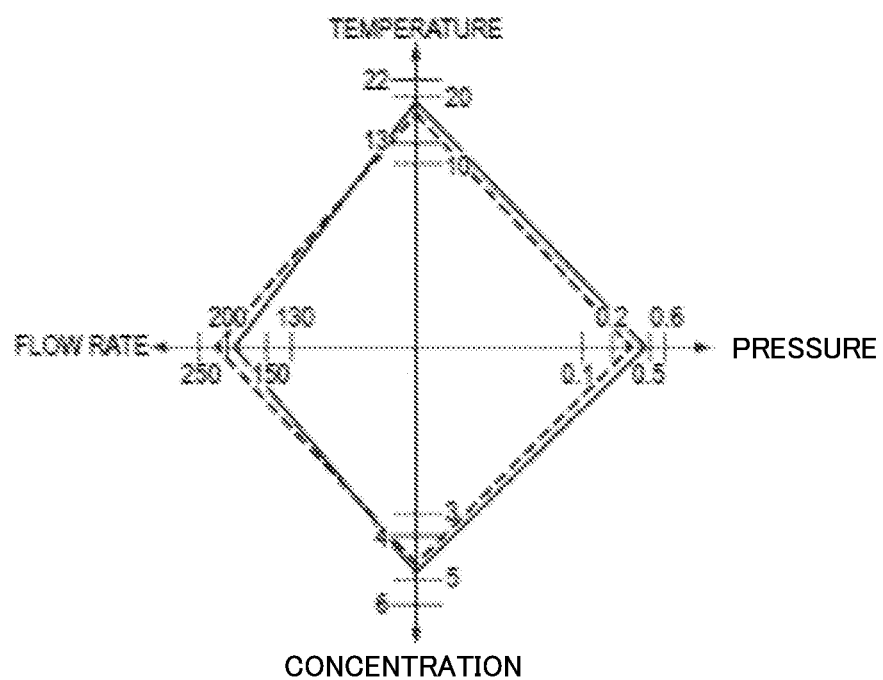
FIG. 13 depicts a display example (3) of the allowable ranges before and after resetting according to one or more embodiments of the present invention.
Figure 14:
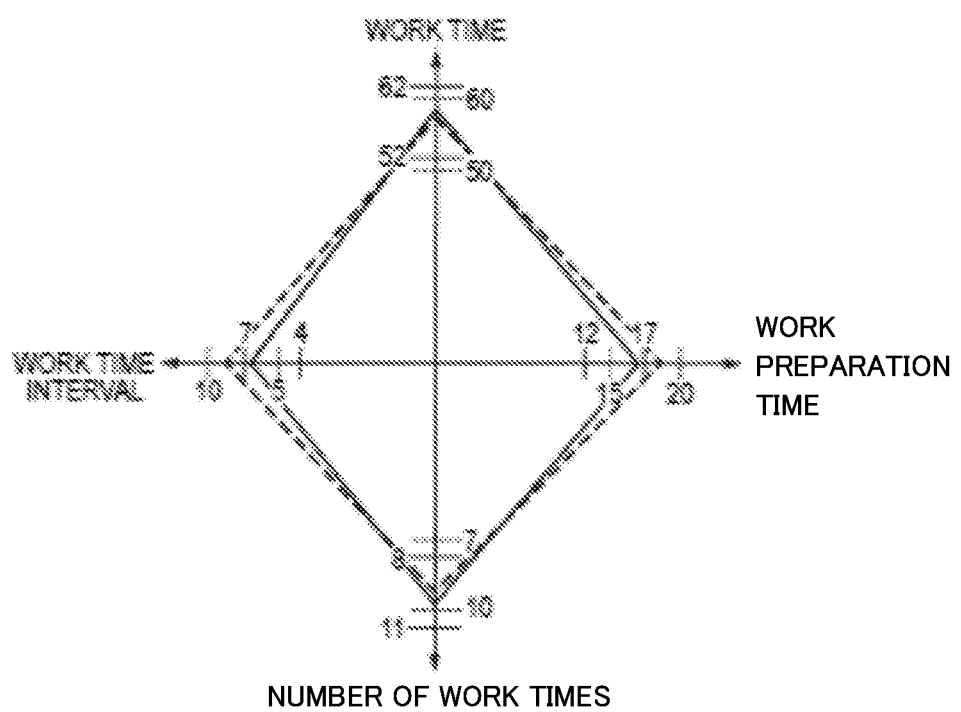
FIG. 14 depicts a display example (4) of the allowable ranges before and after resetting according to one or more embodiments of the present invention.

FIGS. 12 to 14 depict examples of the radar chart showing the element value, the lower limit and the upper limit of each item belonging to the production elements "facility", "process" and "person" when the element value of "viscosity" has changed from 92[VI] to 105[VI] (refer to FIG. 11). The lower limit and the upper limit are shown by the line segments intersecting with the coordinate axis corresponding to each item, before and after resetting. The line segments after resetting may be displayed in an aspect different from the lower limit and the upper limit before resetting so as to express changes in the lower limit and the upper limit. In the examples of FIGS. 12 to 14, the element value, the lower limit and the upper limit after resetting are respectively shown with the solid line, and the element value, the lower limit and the upper limit before resetting are respectively shown with the broken line. More specifically, the upper limit of "amplitude of axial vibration" changes from 10 [μm] before resetting to 9 [μm] after resetting. The lower limit and the upper limit of "frequency of axial vibration" change from 15 [Hz] and 25 [Hz] to 12 [Hz] and 23 [Hz], respectively. The upper limit of "vibration amplitude" changes from 12.5 [μm] to 14 [μm]. The lower limit of "overall heat transfer coefficient" changes from 600 [W/m$^2$/K] to 620 [W/m$^2$/K]. However, the lower limit and the upper limit of "kinetic viscosity" remain as 90[%] and 110[%]. The upper limit of "accumulated number of operation times" remains as $10^6$. Therefore, when the element value of "viscosity" exceeds the upper limit, the user is urged to perform an action for ensuring that the element value of "amplitude of axial vibration" is to be within the range of 9 [μm] or less, the element value of "frequency of axial vibration" is to be within the range of 12 to 23 [Hz], the element value of "vibration amplitude" is to be within the range of 14 [μm] or less and the element value of "overall heat transfer coefficient" is to be within the range of 620 [W/m$^2$/K] or greater, which are the other items reset so that the quality of the product meets the predetermined quality, with respect to the element value of "viscosity" determined as the abnormal item.

In the example of FIG. 12, the latest element values of "amplitude of axial vibration", "frequency of axial vibration", "vibration amplitude", "overall heat transfer coefficient", "kinetic viscosity" and "accumulated number of operation times" are respectively within the allowable ranges. Therefore, the user can immediately perceive that it is not necessary to take exceptional countermeasures for "amplitude of axial vibration", "frequency of axial vibration", "vibration amplitude", "overall heat transfer coefficient", "kinetic viscosity" and "accumulated number of operation times".

In the example of FIG. 13, the lower limit and the upper limit of "temperature" change from 10[° C.] and 20[° C.] to 13[° C.] and 22[° C.], respectively. The lower limit and the upper limit of "flow rate" change from 150 [m$^3$/h] and 250 [m$^3$/h] to 130 [m$^3$/h] and 200 [m$^3$/h], respectively. The lower limit and the upper limit of "concentration" change from 3[%] and 5[%] to 4[%] and 6[%], respectively. The lower limit and the upper limit of "pressure" change from 0.1 [MPa] and 0.5 [MPa] to 0.2 [MPa] and 0.6 [MPa]. Therefore, when the element value of "viscosity" exceeds the upper limit, the user is urged to perform an action for ensuring that the element value of "temperature" is to be within the range of 13 to 22[° C.], the element value of "flow rate" is to be within the range of 130 to 200 [m$^3$/h], the element value of "concentration" is to be within the range of 4 to 6[%] and the element value of "pressure" is to be within the range of 0.2 to 0.6 [MPa], which are the other items reset so that the quality of the product meets the predetermined quality, with respect to the element value of "viscosity" determined as the abnormal item.

In the example of FIG. 13, the latest element values of "temperature", "flow rate", "concentration" and "pressure" are respectively within the allowable ranges. Therefore, the user can immediately perceive that it is not necessary to take exceptional countermeasures for "temperature", "flow rate", "concentration" and "pressure".

In the example of FIG. 14, the lower limit and the upper limit of "work time" change from 50 [min.] and 60 [min.] to 52 [min.] and 62 [min.], respectively. The lower limit and the upper limit of "work time interval" change from 4 [min.] and 7 [min.] to 5 [min.] and 10 [min.], respectively. The lower limit and the upper limit of "number of work times" change from 7[times] and 10[times] to 8[times] and 11 [times], respectively. The lower limit and the upper limit of "work preparation time" change from 15 [min.] and 20 [min.] to 12 [min.] and 17 [min.], respectively. Therefore, when the element value of "viscosity" exceeds the upper limit, the user is urged to perform an action for ensuring that the element value of "work time" is to be within the range of 52 to 62 [min.], the element value of "work time interval" is to be within the range of 5 to 10 [min.], the element value of "number of work times" is to be within the range of 8 to 11 [times] and the element value of "work preparation time" is to be within the range of 12 to 17 [min.], which are the other items reset so that the quality of the product meets the predetermined quality, with respect to the element value of "viscosity" determined as the abnormal item.

In the example of FIG. 14, the latest element values of "work time", "work time interval", "number of work times" and "work preparation time" are respectively within the allowable ranges. Therefore, the user can immediately perceive that it is not necessary to take exceptional countermeasures for "work time", "work time interval", "number of work times" and "work preparation time".

Therefore, the user perceives the abnormal item of which the element value has exceeded the allowable range, determines whether it is necessary to adjust the element values of the other items to be within the displayed allowable ranges, and performs an action, as necessary, so that the user can obtain a chance that the quality of the product meets the predetermined quality before shipment.

(Quality Index Value)

The data analysis unit 264 may determine a quality index value, which indicates a quality of the product in which each item is a corresponding item of the production element, based on the element values of the n items and the respective allowable ranges. In the other light, the quality index value may be regarded as a measure for evaluation generalizing the deviations of the element values of the four elements of production or the n items of a product from the standard values.

FIG. 15 illustrates a calculation example of the quality index value. FIG. 15 indicates the production element, the item of each element, the allowable range, the element value, the evaluation for each element value, the evaluation for each production element, and the comprehensive evaluation in order from left to right. The element value is an element value acquired for each item per sample, which is an evaluation target. The evaluation for each element value indicates whether the element value is included within the allowable range. The symbols o and x indicate that the element value is included within the allowable range and that the element value is beyond the allowable range, respectively. For example, since the element value of "viscosity" is 75[VI] and the allowable range is 80 to 100[VI], which are indicated in a second line of FIG. 15, the data analysis unit 264 determines that the element value is beyond the allowable range. Since the element value of "specific gravity" is 0.85 and the allowable range is 0.8 to 0.9 [kg/m$^3$], which are indicated in a third line of FIG. 15, the data analysis unit 264 determines that the element value is within the allowable range.

The evaluation for each production element indicates whether each production element includes any one item of which the element value is beyond the allowable range or all element values are within the allowable ranges. The symbol o indicates that all the element values are within the allowable ranges, and the symbol x indicates that the element value of any one item is beyond the allowable range. In FIG. 15, in the case of the production element "raw material", since the element value of "viscosity" is beyond the allowable range and the element values of "specific gravity", "boiling point" and "sulfur amount" are all within the allowable ranges, the data analysis unit 264 determines that there is an item of which the element value is beyond the allowable range. In the case of the production element "process", since the element values of "temperature", "flow rate", "pressure" and "concentration" are all within the predetermined allowable ranges, the data analysis unit 264 determines that the element values are all within the allowable ranges. Likewise, in the cases of the production elements "facility" and "person", the data analysis unit 264 determines that the element values are all within the allowable ranges.

The comprehensive evaluation corresponds to the quality index value obtained by generalizing all the production elements. The data analysis unit 264 determines the comprehensive evaluation so that the greater a ratio of the number of the production elements of which the element values of all the items are within the allowable ranges to the total number of the production elements is, the greater the comprehensive evaluation is. More specifically, when the number of the production elements of which the element values of all the items are within the allowable ranges is 0, 1, 2, 3 and 4, the comprehensive evaluation is 0, 25, 50, 75 and 100 points, respectively. In the example of FIG. 15, since the production elements of which the element values of all the items are within the allowable ranges are three elements of "process", "facility" and "person", the data analysis unit 264 determines the quality index value of 75 points, as the comprehensive evaluation. The data analysis unit 264 outputs the determined quality index value to the output processing unit 266. The output processing unit 266 may output the information of the quality index value input from the data analysis unit 264 with being included in the display data to the display unit 30 so as to display the information on the display unit 30.

In the meantime, the data analysis unit 264 may determine the comprehensive evaluation so that the greater a ratio of the number of items of which the element value is within the allowable range to the total number of items is, the greater the comprehensive evaluation is.

(Calculation of Allowable Range)

Subsequently, a calculation example of the allowable range is described.

Figure 16:
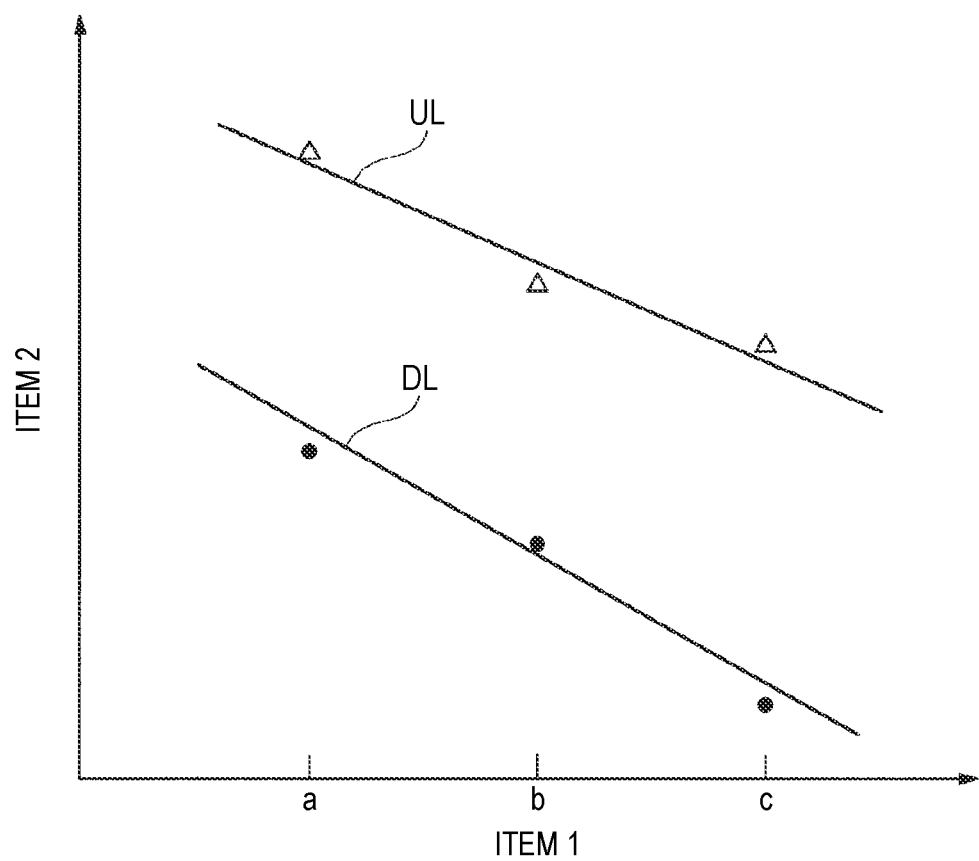
FIG. 16 depicts an example of a function for calculating the allowable range according to one or more embodiments of the present invention.

The data analysis unit 264 calculates the allowable ranges of the other items by using the element value of the abnormal item determined to exceed the allowable range and parameters indicated by the allowable range data, in accordance with a predetermined function. FIG. 16 shows linear functions UL, DL for calculating the upper limit and the lower limit of item 2, which is the other item, from the element value of item 1, which is the abnormal item. In this example, as parameters of the linear function, values of each gradient of the upper limit and the lower limit of each item and intercepts are included in the allowable range data. Therefore, the data analysis unit 264 can calculate parameters for calculating the upper limit from any element value of item 1 so that a difference from a function value, which is calculated in accordance with the linear function from the upper limit ($\Delta$ mark) of item 2 of which the quality of the product meets the predetermined quality at each element value of item 1, is reduced. Also, the data analysis unit 264 can calculate parameters for calculating the lower limit from any element value of item 1 so that a difference from a function value, which is calculated in accordance with the linear function from the lower limit ($\bullet$ mark) of item 2 of which the quality of the product meets the predetermined quality at each element value of item 1, is reduced. When calculating the parameters, the least square method may be used, for example. The data analysis unit 264 presets the upper limit and the lower limit of item 2 for each element value of item 1. The data analysis unit 264 may determine the upper limit and the lower limit of item 2 for each element value of item 1, based on quality information indicating whether the quality of the product meets the predetermined quality for each sample consisting of the element values of the n items, as described later.

The data analysis unit 264 can calculate parameters for calculating the allowable ranges of the other items from the abnormal item, even for other combinations of the abnormal item and the other items, in the same manner. In the meantime, parameters for calculating the relative limit values for giving the allowable range of the relative value can also be calculated by applying the method to the relative value of the abnormal item and the relative limit values of the other items.

In the meantime, a function for calculating the allowable ranges of the other items from the element value of the abnormal item is not limited to the linear function and may be a high-dimensional function such as secondary or higher function. Depending on a type of the function and the element value of the abnormal item, there may be an item that does not have the upper limit and the lower limit for giving the allowable range. The data analysis unit 264 may output abnormality information, which indicates that there is no allowable range of the corresponding item, to the output processing unit 266. When the abnormality information is output from the data analysis unit 264, the output processing unit 266 may output the abnormality information, which indicates that there is no effective allowable range of the corresponding item, to the display unit 30.

Also, since the number of items of the abnormal item is not limited to one item and is multiple items, a plurality of pieces of allowable ranges may be determined for the other items. In this case, the data analysis unit 264 may adopt, as the allowable range to be output to the output processing unit 266, the narrowest allowable range of the plurality of pieces of allowable ranges, or may adopt, as the allowable range to be output, a range in which the plurality of pieces of allowable ranges is all overlapped. As a result, even when there is no allowable range to be output, the data analysis unit 264 may output the abnormality information to the output processing unit 266.

In the meantime, the data analysis unit 264 may calculate the allowable range in which the quality of the product meets the predetermined quality in an n-dimensional space, based on the quality information indicating whether the quality of the product meets the predetermined quality for each sample, which is a set (n-dimensional vector) of the element values of the n items. For example, the data analysis unit 264 may calculate a model parameter of a statistical model so that a probability, which is to be calculated by the statistical model from the set of the element values of the n items corresponding to a quality meeting a predetermined quality, is to be approximated to 1 and a probability, which is to be calculated by the statistical model from the set of the element values of the n items corresponding to a quality not meeting the predetermined quality, is to be approximated to 0. As the statistical model, for example, a mixed Gaussian model may be used. The mixed Gaussian model is a probability model with which a probability associated with the n-dimensional vector is displayed by a weighting sum of n-dimensional normal distributions where mean values and variances are different. In the mixed Gaussian model, a mean value, a variance and a weight coefficient of each n-dimensional normal distribution are model parameters. The data analysis unit 264 may determine, as the allowable region, a region of an n-dimensional space in which a probability obtained using the calculated model parameters is equal to or larger than a predetermined probability value (for example, 0.9). The data analysis unit 264 may apply a boundary plane, which is an outer border of the allowable region, to a predetermined function (for example, an equation of an n-dimensional elliptical surface) and store parameters of the function in the storage 25, as a part of the allowable range data.

The data analysis unit 264 determines a larger value and a smaller value of the element values of the other dimension at intersection points of the boundary plane, which is an outer border of the allowable region, and a straight line or plane at which the element value of one dimension (notice dimension) is constant, as the upper limit and the lower limit of the allowable range of the other dimension. The data analysis unit 264 may determine the element value of the determined notice dimension and the upper limit and the lower limit of the other dimension, as the element value of the abnormal item and the upper limit and the lower limit of the other item, respectively.

Also, when there are intersection points of a straight line or plane at which the element value of the notice dimension is constant and the boundary plane, which is an outer border of the allowable region, the data analysis unit 264 determines a larger value and a smaller value of the element values of the notice dimension at the intersection points, as the upper limit and the lower limit of the allowable range of the notice dimension, respectively. The data analysis unit 264 may determine the upper limit and the lower limit of the allowable range of the notice dimension, as the upper limit and the lower limit of the allowable range of the abnormal item, respectively. In the meantime, for an item of which one limit value of the upper limit and the lower limit is not set, the data analysis unit 264 does not have to determine the one limit value and has only to determine the other limit value.

Subsequently, additional embodiments of the present invention are described. In the below, differences from the above-described embodiments are mainly described. The same configurations as the above-described embodiments are denoted with the same reference numerals, and the descriptions thereof are quoted.

Figure 17:
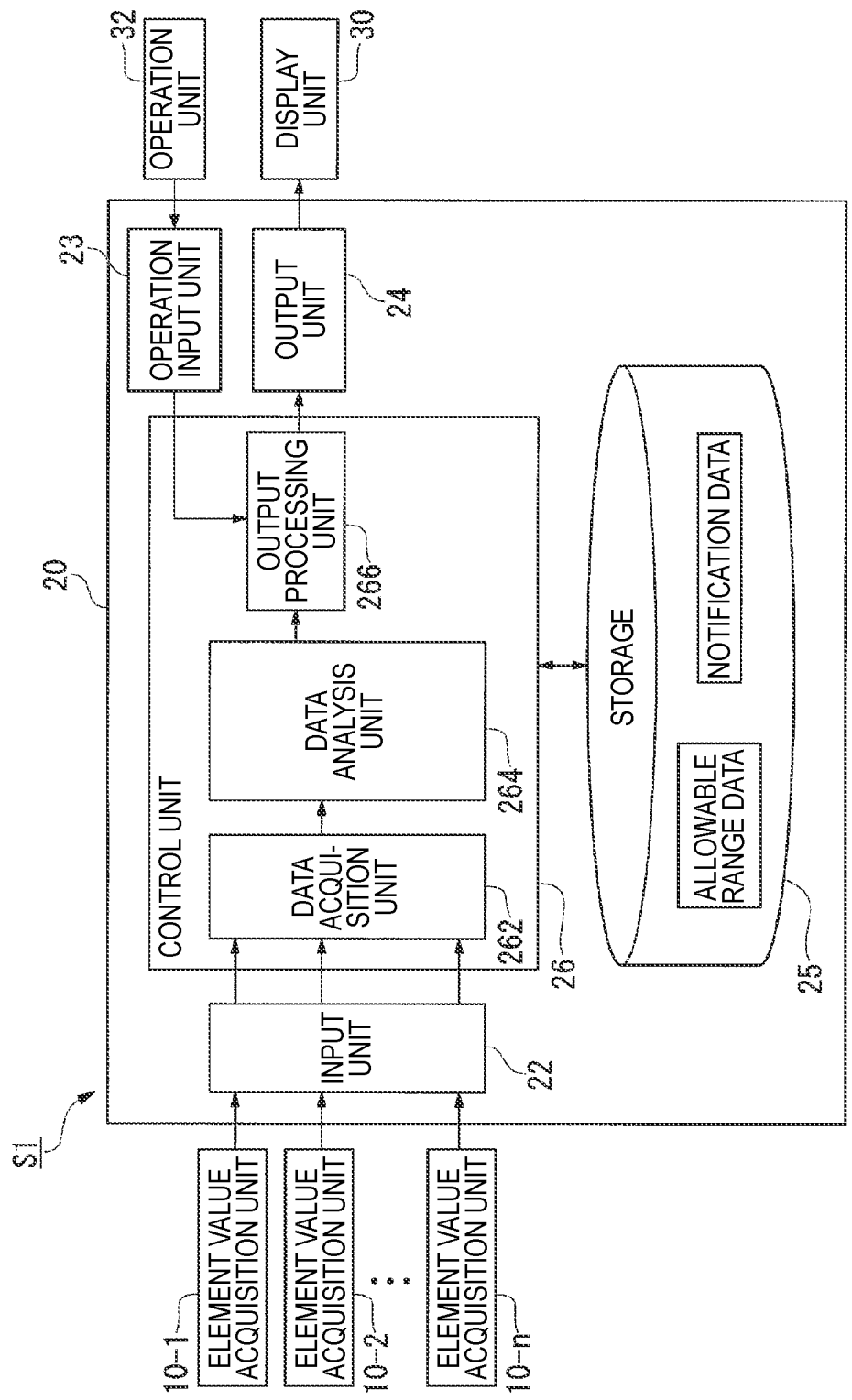
FIG. 17 is a block diagram depicting a configuration example of a production support system according to one or more embodiments of the present invention.

FIG. 17 is a block diagram depicting a configuration example of the production support system S1 according to one or more embodiments of the present invention.

In one or more embodiments of the present invention, notification data is stored in advance in the storage 25. The notification data is configured by associating notification information with each item of the element value. In each notification information, one or both of cause information and countermeasure information are included. The cause information is information indicative of an event, which is a cause due to which the element value of the abnormal item exceeds the allowable range, or an event that is caused when the element value of the abnormal item exceeds the allowable range. The countermeasure information is information indicative of a countermeasure to ensure the quality of the product meets the predetermined quality when the element value of the abnormal item exceeds the allowable range. The countermeasure may be a countermeasure to ensure that the element value of the other item is to be included within the changed allowable range or may be a countermeasure of solving or relieving an event, which is a cause due to which the element value of the abnormal item exceeds the allowable range, or an event that is caused when the element value of the abnormal item exceeds the allowable range.

When it is determined that the element value of at least one item exceeds the allowable range, the data analysis unit 264 generates determination result information, which indicates the abnormal item of which the element value exceeds the allowable range, and outputs the generated determination result information to the output processing unit 266.

The output processing unit 266 specifies the abnormal item, which is indicated by the determination result information input from the data analysis unit 264, and reads out the notification information corresponding to the specified item from the notification data stored in advance in the storage 25. The output processing unit 266 outputs display data for displaying the read notification information to the display unit 30 via the output unit 24. The display unit 30 displays notification information indicated by the notification information input from the output processing unit 266.

Figure 18:
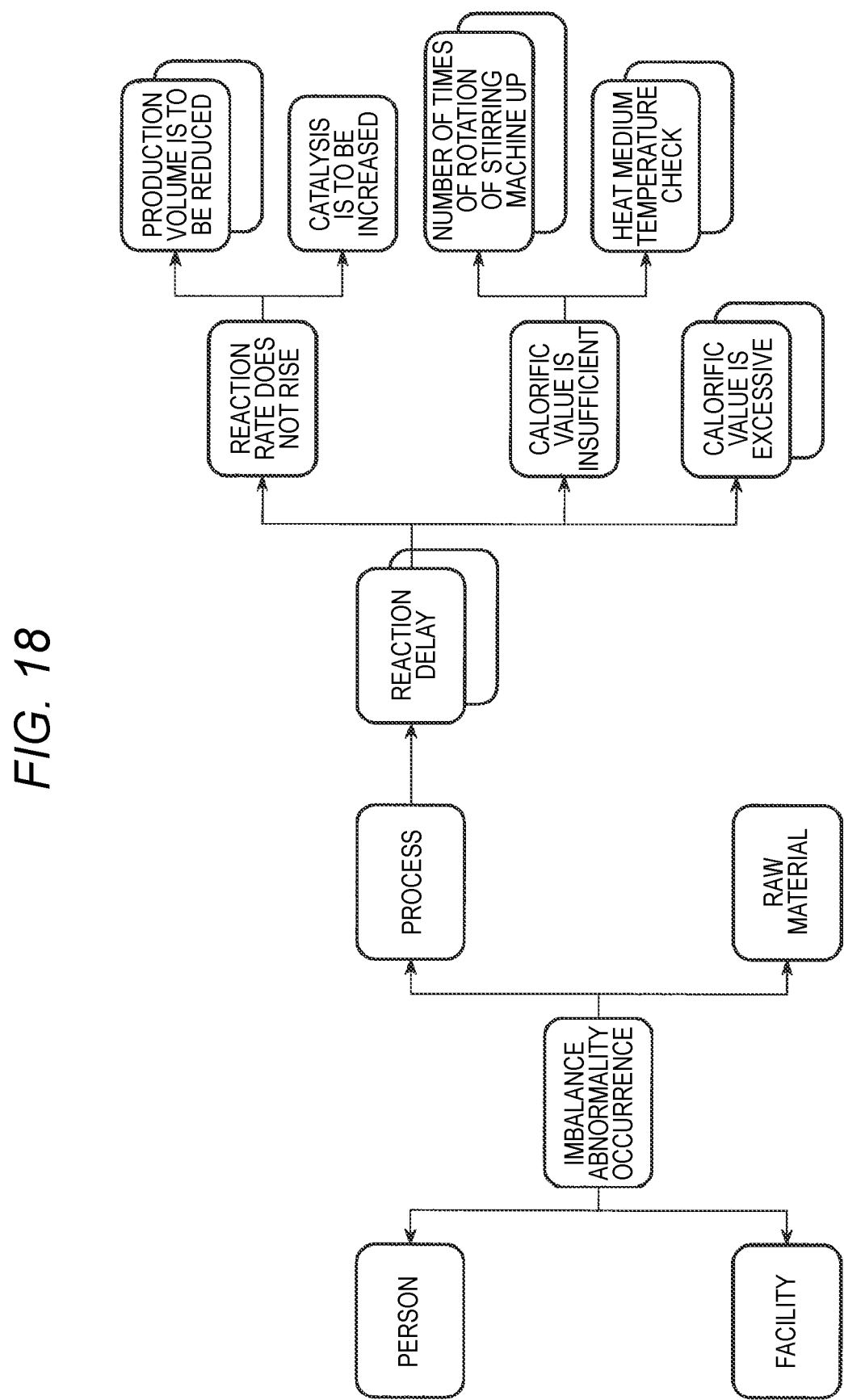
FIG. 18 depicts a screen display example of notification information according to one or more embodiments of the present invention.

FIG. 18 depicts a screen display example of the notification information. FIG. 18 depicts a display example of the notification information that is displayed when the element value of the item of the production element "process" exceeds the allowable range.

Blocks of "person", "facility", "process" and "raw material" arranged at end points of arrows of which start points are a block of "imbalance abnormality occurrence" are blocks indicative of the production elements, respectively. An arrow of which a start point is the block of "process" indicates occurrence of the abnormal item belonging to "process". In blocks of "reaction delay" and thereafter indicated at an end point of the arrow, events that are caused due to a phenomenon that "temperature", which is the occurred abnormal item, is lower than the lower limit, and the countermeasures for solving or relieving the phenomenon are hierarchically shown.

The block of "reaction delay" is the cause information indicative of an event that is caused when "temperature" is lower than the lower limit. Blocks of "reaction rate does not rise", "calorific value is insufficient" and "calorific value is excessive" indicated by arrows of which start points are the block of "reaction delay" indicate the cause information indicative of causes of "reaction rate does not rise". Blocks of "production volume is to be reduced" and "catalysis is to be increased" indicated by arrows of which starts points are the block of "reaction rate does not rise" indicate the countermeasure information against "reaction rate does not rise". "Production volume is to be reduced" indicates reduction in "operating time", "number of operation times" and the like, which are the items of "facility", which is another production element. "Catalyst is to be increased" indicates lowering in "viscosity", which is an item of the raw material, which is another production element.

Blocks of "number of rotations of stirring machine UP" and "heat medium temperature check" indicated by arrows of which start points are the block of "calorific value is insufficient" indicate countermeasure information indicative of countermeasure against "calorific value is insufficient". "Number of rotations of stirring machine UP" indicates an increase in "number of rotations of stirring machine", which is an item of "facility", which is another production element. "Heat medium temperature check" indicates a check on "heat medium temperature" relating to the item "process", which is the production element in which the abnormal item occurred.

The data analysis unit 264 may generate the notification information by analyzing a cause and a countermeasure, as described later, for example.

The data analysis unit 264 classifies a set A consisting of samples where the quality of the product meets the predetermined quality and the element value of one item, which is an analysis target, is within a predetermined value range and a set B consisting of samples where the quality of the product does not meet the predetermined quality and the element value of one item is within the predetermined value range, from the quality information indicative of qualities of each sample consisting of the element values of the collected n items. In the below, one item, which is an analysis target, is referred to as an analysis item.

The data analysis unit 264 detects, as a cause item, an item that has a significant difference with respect to a representative value (for example, mean value) of the element value between the set A and the set B and is a separate item from the analysis item. The cause item relates to an event, which is a cause due to which an element value of a target item exceeds the allowable range, or an event that is caused when the element value of the target item exceeds the allowable range. When determining whether or not the significant difference, the data analysis unit 264 may use a statistical method such as a t-test. The t-test is a method of determining that there is a significant difference between sets having two values as elements when a difference between the mean values of the respective sets is sufficiently larger than a variance of difference between the elements of values, which are elements of the respective sets.

The data analysis unit 264 specifies, as the countermeasure to ensure that the quality of the product meets the predetermined quality, processing of approximating a representative value b of the element value of the cause item of the sample included in the set B to a representative value a of the element value of the cause item of the sample included in the set A. For example, when a temperature Ta, which is the representative value of the set A, is lower than a temperature Tb, which is the representative value of the set B, the data analysis unit 264 specifies processing of lowering the temperature T (for example, processing of lowering heat medium temperature), as the countermeasure.

The data analysis unit 264 stores notification information, which includes notification information indicating cause information indicative of the specified cause item and countermeasure information indicative of the specified countermeasure for each set of the target item and the value range, in the storage 25.

The data analysis unit 264 executes the above processing for each set of the target item and the value range. For the data analysis unit 264, a range of the element value obtained by dividing in advance a section between the maximum value and the minimum value, which can be taken as the element value of the target item, into a plurality of steps (for example, three or more steps) is set in advance, as the value range.

The data analysis unit 264 outputs the information indicative of the element value of the abnormal item with being included in the determination result information indicative of the abnormal item to the output processing unit 266. The output processing unit 266 specifies the abnormal item and the element value indicated by the determination result information input from the data analysis unit 264, and specifies a value range in which the specified element value is included. The output processing unit 266 reads out the notification information associated with a set of the same item and value range as the set of the specified abnormal item and value range from the notification data stored in the storage 25, and outputs display data for displaying the read notification information to the display unit 30.

Subsequently, an analysis example of the cause item and countermeasure information accompanied by the generation of the notification information is described. In the below, the description of the value range is omitted. First, a case where the cause item is to be analyzed for the target item "viscosity" of the production element "raw material" is exemplified. The data analysis unit 264 determines whether there is a significant difference between a set of samples of the element values with which the quality of the product meets the predetermined quality and a set of samples of the element values with which the quality of the product does not meet the predetermined quality, with respect to the representative value of each element value of the items "temperature", "flow rate" and the like of the production element "process". When there is a significant difference with respect to "temperature" and there is no significant difference with respect to "flow rate", the data analysis unit 264 determines "temperature", as the cause item. Then, the data analysis unit 264 compares the representative value of "temperature", which is included in the set of the samples where the quality of the product does not meet the predetermined quality, and the representative value of "temperature", which is included in the set of the samples where the quality of the product meets the predetermined quality. When the latter is higher than the former, the data analysis unit 264 determines the rising of "temperature", as the countermeasure information. Thereby, when the observed "viscosity" is greater than the predetermined allowable range, the rising of "temperature" is presented as the countermeasure to ensure that the quality of the product meets the predetermined quality.

The data analysis unit 264 determines whether there is a significant difference between a set of samples of the element values with which the quality of the product meets the predetermined quality and a set of samples of the element values with which the quality of the product does not meet the predetermined quality, with respect to the representative value of each element value of the items "kinetic viscosity", "amplitude of axial vibration" and the like of the production element "facility". When there is a significant difference with respect to "kinetic viscosity" and there is no significant difference with respect to "amplitude of axial vibration", the data analysis unit 264 determines "kinetic viscosity", as the cause item. Then, the data analysis unit 264 compares the representative value of the element value of "kinetic viscosity", which is included in the set of the samples where the quality of the product does not meet the predetermined quality, and the representative value of the element value of "kinetic viscosity", which is included in the set of the samples where the quality of the product meets the predetermined quality. When the latter is lower than the former, the data analysis unit 264 determines the lowering of "kinetic viscosity", as the countermeasure information. Thereby, when the observed "viscosity" is greater than the predetermined allowable range, the lowering of "kinetic viscosity" is presented as the countermeasure to ensure that the quality of the product meets the predetermined quality.

Subsequently, a case where the cause item is to be analyzed for the target item "temperature" of the production element "process" is exemplified. The data analysis unit 264 determines whether there is a significant difference between a set of samples of the element values with which the quality of the product meets the predetermined quality and a set of samples of the element values with which the quality of the product does not meet the predetermined quality, with respect to the representative value of each element value of the items "viscosity", "specific gravity" and the like of the production element "raw material". When there is a significant difference with respect to "viscosity" and there is no significant difference with respect to "specific gravity", the data analysis unit 264 determines "viscosity", as the cause item. Then, the data analysis unit 264 compares the representative value of the element value of "viscosity", which is included in the set of the samples where the quality of the product does not meet the predetermined quality, and the representative value of the element value of "viscosity", which is included in the set of the samples where the quality of the product meets the predetermined quality. When the latter is lower than the former, the data analysis unit 264 determines the lowering of "viscosity", as the countermeasure information. The data analysis unit 264 may include an increase in an amount of catalyst in the notification information, as the countermeasure information for lowering "viscosity".

A case where the cause item is to be analyzed for the target item "vibration amplitude" of the production element "facility" is exemplified. The data analysis unit 264 determines whether there is a significant difference between a set of samples of the element values with which the quality of the product meets the predetermined quality and a set of samples of the element values with which the quality of the product does not meet the predetermined quality, with respect to the representative value of each element value of the items "work time", "number of work times" and the like of the production element "person". When there is a significant difference with respect to "work time" and "number of work times", the data analysis unit 264 determines "work time" and "number of work times", as the cause item. Then, the data analysis unit 264 compares the representative value of each element value of "work time" and "number of work times", which are included in the set of the samples where the quality of the product does not meet the predetermined quality, and the element values of "work time" and "number of work times", which are included in the set of the samples where the quality of the product meets the predetermined quality. When the latter is smaller than the former, respectively, the data analysis unit 264 determines the reduction of "work time" and "number of work times", as the countermeasure information. Also, an operator's operation inexperience on the facility is estimated as the cause of the phenomenon. The data analysis unit 264 may include the countermeasure information, which indicates an operator's operation training and the like, in the notification information, in correspondence to the operation.

(Provision of Operation Information)

Subsequently, another configuration example according to one or more embodiments of the present invention is described. FIG. 19 is a block diagram depicting another configuration example of the production support system S1 in accordance with one or more embodiments of the present invention. In this configuration example, the production support system S1 further includes an operation support apparatus 40. The operation support apparatus 40 is an apparatus for supporting an operation of the production facility on the basis of an operation of an operator who is the user. Upon the operation support, commands of start and stop of an operation of a device configuring the production facility and setting, change and deletion of diverse parameters are instructed by an operation.

In the storage 25, the operation data is stored in advance. The operation data is configured by associating the operation information with each item of the element value. In the operation information, a command for setting the element values of the other items to be within the changed allowable ranges when the element value of the corresponding item exceeds the allowable range. In other words, the operation information is information indicative of one or more commands for enabling a target device, which is a command target, to execute the countermeasure indicated by the countermeasure information, via the operation support apparatus 40. The operation information may be configured by a file that is described by a language that can be interpreted (parsed) by a device control unit (not shown) of the operation support apparatus 40. As the language, for example, a markup language such as XML (Extensible Markup Language) can be used. In the command, description of identification information of the target device and description of parameters relating to execution of operations of the target device may be included. The operation information includes a conditional branching sentence such as 'if sentence', and a command and an execution condition of processing indicated by the command may be described in association with each other.

The output processing unit 266 specifies the abnormal item, which is indicated by the determination result information input from the data analysis unit 264, and reads out the operation information corresponding to the specified item from the operation data stored in advance in the storage 25. The output processing unit 266 outputs the read operation information to the operation support apparatus 40 via the output unit 24.

Also, the operation data to be stored in the storage 25 may be configured by the analysis of the cause and countermeasure thereof, including the operation information, which indicates a command for executing the countermeasure obtained by the analysis for each set of the item of the element value and the value range. In this case, the data analysis unit 264 outputs the determination result information indicative of the abnormal item, in which the information indicative of the element value of the abnormal item is included, to the output processing unit 266. The output processing unit 266 specifies the abnormal item and the element value indicated by the determination result information input from the data analysis unit 264, and specifies the value range in which the specified element value is included. The output processing unit 266 reads out the operation information associated with a set of the same item and value range as the set of the specified abnormal item and value range from the operation data, and outputs the read operation information to the operation support apparatus 40.

The device control unit of the operation support apparatus 40 transmits the command, which is indicated by the operation information input from the output processing unit 266, to the target device. When the identification information of the target device is included in the command, the output processing unit 266 specifies, as a transmission destination, the target device indicated by the identification information. When the description of parameters is included in the command, the output processing unit 266 transmits the command including the description to the target device. The target device executes an operation instructed by the command, based on the associated parameters. When the execution condition is associated with the command, the output processing unit 266 determines whether the execution condition associated at that point in time is satisfied, and transmits the command to the target device when it is determined that the execution condition is satisfied.

In the meantime, when determining whether the element value exceeds the allowable range, the data analysis unit 264 may determine whether the element value of the item of which the allowable range is indicated by the upper limit and the lower limit is smaller than the lower limit and larger than the upper limit. That is, the data analysis unit 264 may output the determination result information, which indicates whether the element value is smaller than the lower limit, is larger than the upper limit or is within the allowable range, to the output processing unit 266. In the below, a state where the element value is outside the allowable range is collectively referred to as 'allowable range-outside state', and a state, which is lower than the lower limit, of the allowable range-outside state is referred to as 'under state', and a state that is larger than the upper limit is referred to as 'over state'.

Also, the notification data and the operation data may be configured by independently associating the notification information with each allowable range-outside state of each item, i.e., each of "under state" and "over state".

The output processing unit 266 reads out the notification information, which corresponds to the allowable range-outside state of the item of the abnormal value indicated by the determination result information input from the data analysis unit 264, from the notification data stored in advance in the storage 25. The output processing unit 266 outputs the display data for displaying the read notification information to the display unit 30.

Thereby, in the case where the element value becomes larger than the upper limit and in the case where the element value becomes smaller than the lower limit, if the causes thereof or the countermeasures to ensure that the element values of the other items are to be within the allowable ranges when the element value is the abnormal value are different, the notification information corresponding to each case is displayed on the display unit 30.

The output processing unit 266 reads out the operation information, which corresponds to the allowable range-outside state of the item of the abnormal value indicated by the determination result information output from the data analysis unit 264, from the operation data stored in advance in the storage 25. The output processing unit 266 outputs the read operation information to the operation support apparatus 40. The operation support apparatus 40 specifies the command included in the operation information input from the output processing unit 266 and outputs the command to the target device of the specified command.

Thereby, in the case where the element value of the abnormal item becomes larger than the upper limit and in the case where the element value becomes smaller than the lower limit, when the countermeasures to ensure that the element values of the other items are to be within the allowable ranges with respect to the occurrence of the abnormal item are different, the commands corresponding to each of the cases are provided to the operation support apparatus 40 and the target device.

As described above, the production support system S1 according to one or more embodiments of the present invention includes the data acquisition unit 262 configured to acquire the plurality of element values relating to the production elements of a product. Also, the production support apparatus 20 includes the data analysis unit 264 that is configured to determine whether the element values are within the allowable ranges in which the quality of the product meets the predetermined allowed quality and to reset the allowable ranges of one or a plurality of other element values to the allowable ranges in which the quality of the product meets the predetermined quality, when it is determined that at least one element value exceeds the allowable range. Also, the production support system S1 includes the output processing unit 266 configured to output the information about the reset allowable ranges.

By the above configuration, when there is an abnormal item, which is determined to exceed the allowable range, of the element values of the plurality of items, the allowable ranges of the element values of the other items, which are items separate from the abnormal item, are reset to the allowable ranges in which the predetermined quality is satisfied. The user having received the information about the reset allowable ranges is urged to perform an action to set the element values of the other items to be within the notified allowable ranges and is also urged to ensure that the quality of the product meets the predetermined quality without being contradictory to improvement of management indexes.

Also, the output processing unit 266 may be configured to generate the display data for displaying the allowable ranges of the element values of the other items. By this configuration, the allowable ranges of the element values of the other items are recognizably notified to the user.

Also, the display data that is to be output by the output processing unit 266 may be data indicative of the radar chart showing the values of the allowable ranges of the element values of the other items.

By the above configuration, even the user who is not familiar with the production management can intuitively perceive the reset allowable ranges of the element values of the plurality of other items at one time.

Also, the production support system S1 may include the storage 25 in which the item of which the element value exceeds the allowable range and the event, which is a cause due to which the element value exceeds the allowable range, the event that is caused when the element value exceeds the allowable range or the notification information indicative of the countermeasure to ensure that the quality of the product meets the predetermined quality are stored in association with each other. The output processing unit 266 may be configured to output the notification information, which is associated with the item of the element value determined to exceed the allowable range, of the notification information stored in the storage 25.

By the above configuration, when there is the abnormal item determined to exceed the allowable range, the cause information indicative of the event, which is a cause of the occurrence of the abnormal item, or the event that is caused due to the occurrence of the abnormal item or the countermeasure information indicative of the countermeasure to ensure that the quality of the product meets the predetermined quality is notified. Accordingly, the user having received the notification information is urged to perceive an influence of the notified event or to execute the notified countermeasure.

Also, the production support system S1 may include the storage 25 in which the item of the element value exceeding the allowable range and the operation information indicative of execution of the countermeasure to ensure that the quality of the product meets the predetermined quality are stored in association with each other. The output processing unit 266 may be configured to output the operation information, which includes the command indicative of execution of the countermeasure to ensure that the quality of the product meets the predetermined quality, which is associated with the item of the element value determined to exceed the allowable range, of the operation information stored in the storage 25.

By the above configuration, when there is an abnormal item determined to exceed the allowable range, the target device receives the command indicated by the operation information from the output processing unit 266 via the operation support apparatus 40, and executes processing of the countermeasure instructed by the command. Therefore, even though the user does not perform an operation, meets the predetermined quality, the production facility is controlled so that a quality of a product, which is to be produced.

Also, the data analysis unit 264 is configured to specify, as a cause item relating to a cause of excess of the allowable range, an item that is a separate item from one item and has a significant difference with respect to a representative value of the element value between a first set consisting of first samples, which are samples consisting of the element values of the plurality of items with which the quality of the product meets the predetermined quality, and in which the element value of the one item is within a predetermined value range, and a second set consisting of second samples, which are samples consisting of the element values of the plurality of items with which the quality of the product does not meet the predetermined quality, and in which the element value of the one item is within the value range.

By the above configuration, an item, which may make the quality of the product meet the predetermined quality by the change of the element value thereof and is separate from the target item, is specified as the cause item from the plurality of collected samples consisting of the element values of the plurality of items. Accordingly, when the target item is determined as the abnormal item of which the element value exceeds the allowable range, the information effective to ensure that the quality of the product meets the predetermined quality is provided as the notification information relating to the specified cause item.

Also, the data analysis unit 264 is configured to determine, as the countermeasure to ensure that the quality of the product meets the predetermined quality, the processing of approximating the representative value of the element value of the cause item in the second set to the representative value of the element value of the cause item in the first set.

By the above configuration, the processing for approximating the representative value of the element value of the cause item in the second set to the representative value of the element value of the cause item in the first set is specified as the countermeasure to ensure that the quality of the product meets the predetermined quality. Therefore, when the target item is determined as the abnormal item of which the element value exceeds the allowable range, the notification information or the operation information, which indicates the processing of approximating the representative value of the element value of the cause item in the second set to the representative value of the element value of the cause item in the first set, is provided. The user is further urged to execute the countermeasure, which is effective to ensure that the quality of the product meets the predetermined quality, irrespective of the user's experience or proficiency.

Also, the data analysis unit 264 may be configured to calculate a parameter of a function for calculating the allowable ranges of the other element values from the at least one element value, based on the quality information indicating whether the quality of the product to be produced under the plurality of element values meets the predetermined quality.

By the above configuration, a parameter of the function for calculating the allowable ranges of the other items from the element value of the abnormal item, which is an empirical equation, is obtained on the basis of the quality information already collected. When calculating the parameter, the quality information collected by the production activity is used, so that the allowable ranges appropriate to the production elements such as facility, person and the like to be actually used are obtained.

Also, the data analysis unit 264 may be configured to calculate an index value of the quality of the product to be produced, based on whether the acquired element value is included in the allowable range of each item.

By the above configuration, it is possible to quantify the quality of the product obtained by generalizing the element values of the plurality of items by the simple processing, based on the relation between the element value already acquired and the allowable range. By the obtained index value, a degree of inclusion of the element value in the allowable range is perceived as the whole element values of the plurality of items.

Also, the data analysis unit 264 may be configured to calculate an index value of the quality of the product to be produced, on the basis of a relative value based on a predetermined standard value of the element value of each item.

By the above configuration, the index value of the quality of the product obtained by generalizing the element values of the plurality of items is obtained, considering a degree of deviation of the acquired element value from the predetermined standard value. By the obtained index value, a degree of deviation of the element value from the standard value is perceived as the whole element values of the plurality of items.

Also, the plurality of element values includes at least two of an element value of an item relating to a raw material of a product, an element value of an item relating to a production process of a product, an element value of an item relating to a production facility of a product, and an element value of an item relating to a person relating to production of a product.

By the above configuration, the allowable range is reset on the basis of a complementarity relation between the plurality of production elements of the four elements of production. That is, when an abnormal item determined to exceed the allowable range occurs, the allowable ranges of the element values of the other items belonging to the production elements different from the abnormal item are reset. Therefore, even when the production element of which an element value of even one item exceeds the allowable range occurs, the user is urged to perform an action to ensure that the quality of the product meets the predetermined quality by adjusting the element values of items of production elements different from the corresponding production element.

Although various embodiments of the present invention have been described with reference to the drawings, the specific configuration is not limited to the above-described configuration and a variety of designs can be made without departing from the gist of the present disclosure.

For example, the production support apparatus 20 may be configured as a production support apparatus in which one or both of the display unit 30 and the operation unit 32 are integrated.

The operation unit 32 may be configured as a signal touch panel having the display unit 30 integrated thereto.

The output processing unit 266 may be configured to execute one or both of the specifying of the notification information and the output of the display data for displaying the specified notification information and the specifying of the operation information and the output of the specified operation information. The output processing unit 266 may be configured to execute the output of the operation information and not to execute the generation and output of the display data indicative of the element value or the allowable range.

Also, in the production support system S1, the operation support apparatus 40 or the operation terminal device may include an output processing unit 466' (not shown) having a function and a configuration similar to the output processing unit 266. The output processing unit 466' is configured to generate the display data, based on the allowable range data and the element value data input from the data analysis unit 264 of the production support apparatus 20. The output processing unit 466' is configured to output the generated display data to a display unit. The display unit, which is an output destination of the display data, may be the display unit 30 or a display unit (not shown) separate from the display unit 30. When the output processing unit 466' is provided, the output processing unit 266 of the production support apparatus 20 may be omitted.

The production support apparatus 20 may be integrated with the operation support apparatus 40, so that it may be configured as a single production support apparatus 20, as one constitutional element of the production support system S1. The operation support apparatus 40 functions as an operation support unit, which is a part of the production support apparatus 20. In this case, the notification data or the operation data may not be necessarily stored in the storage 25.

Also, in the above embodiments, each element value acquisition unit 10 acquires the element value of each item, and acquires the element values of the n items, as the whole production support system S1. However, the present invention is not limited thereto (FIGS. 1, 17, and 19). In the production support system S1, some element value acquisition units may be configured to acquire the element values of the plurality of items. For example, the element value acquisition unit 10-4 provided to measure the work time may have a configuration similar to the element value acquisition unit 10-3 (FIG. 1), and may be further configured to acquire the element value relating to the process and to transmit the acquired element value to the production support apparatus 20. In this case, the element value acquisition unit 10-3 may be omitted. Therefore, the number of the element value acquisition units 10 may be smaller than n.

Also, the production support system S1 may be configured as a production system integrated with the production facility.

The production support apparatus 20 may be implemented by a computer. In this case, a program for implementing each control function is recorded in a computer-readable recording medium, a computer system is enabled to read the program recorded in the recording medium and the program is executed by one or more arithmetic processing circuits such as a CPU, so that the production support apparatus may be implemented. In the meantime, the "computer system" is a computer system embedded in each device, and includes an OS and hardware such as a peripheral device. Also, the "computer-readable recording medium" indicates a portable medium such as a flexible disc, a magnetic optical disc, a ROM, a CD-ROM and the like and a storage device such as a hard disc embedded in the computer system. Also the "computer-readable recording medium" may include a medium capable of dynamically holding the program in a short time, such as a communication wire when the program is transmitted through a network such as the Internet and a communication line such as a phone line, and a medium capable of holding the program for a predetermined time, such as a volatile memory in the computer system that is a server or a client in the above case. Also, the program may be a program for implementing some of the above-described functions or may be a program configured to implement the above-described functions by a combination with a program recorded in advance in the computer system. Also, the computer system may be configured as a computing resource that is a constitutional element of a cloud computing system capable of transmitting and receiving a variety of data through the network.

Also, some or all of each device may be implemented as an integrated circuit such as LSI (Large Scale Integration). Each functional block of each device may be individually configured as a processor or some or all of the blocks may be integrated and configured as a processor. Also, the integration circuit method is not limited to the LSI and may be implemented by a dedicated circuit or a general-purpose processor. Also, when an integration circuit technology replacing the LSI appears as the semiconductor technology is developed, an integrated circuit made by the technology may also be used.

(1) A production support system that relates to one or more embodiments of the present invention and is configured to process a raw material and to produce a product includes: an acquisition unit configured to acquire a plurality of element values relating to production elements of the product; an analysis unit that is configured to determine whether the element values are within allowable ranges in which a quality of the product meets a predetermined allowed quality and reset the allowable ranges of one or a plurality of other element values to the allowable ranges in which the quality of the product meets the predetermined quality, when it is determined that at least one element value exceeds the allowable range; and an output processing unit configured to output information about the reset allowable ranges.

(2) The output processing unit may be configured to generate display data for displaying the allowable ranges of the one or the plurality of other element values.

(3) The display data may be data indicative of a radar chart showing the one or the plurality of other element values and the allowable ranges.

(4) The production support system may further include a storage in which an item of which an element value exceeds the allowable range and an event which is a cause due to which the element value exceeds the allowable range or notification information indicative of a countermeasure to ensure that the quality of the product meets the predetermined allowed quality are stored in association with each other. And the output processing unit may be configured to output the notification information associated with the item of the element value determined to exceed the allowable range.

(5) The production support system may further include a storage in which an item of an element value exceeding the allowable range and operation information indicative of execution of a countermeasure to ensure that the quality of the product meets the predetermined quality are stored in association with each other. And the output processing unit may be configured to output the operation information that is stored in the storage and is associated with an item of an element value determined to exceed the allowable range.

(6) The analysis unit may be configured to specify, as a cause item relating to a cause of excess of the allowable range, an item that is a separate item from one item and has a significant difference with respect to a representative value of element values between a first set consisting of first samples, which are samples consisting of element values of a plurality of items with which the quality of the product meets the predetermined quality, and in which the element value of the one item is within a predetermined value range, and a second set consisting of second samples, which are samples consisting of element values of a plurality of items with which the quality of the product does not meet the predetermined quality, and in which the element value of the one item is within the predetermined value range.

(7) The analysis unit may be configured to determine, as the countermeasure, processing of approximating the representative value of the element value of the cause item in the second set to the representative value of the element value of the cause item in the first set.

(8) The analysis unit may be configured to calculate a parameter of a function for calculating the allowable ranges of the one or the plurality of other element values from the at least one element value, based on quality information indicating whether the quality of the product to be produced under the plurality of element values meets the predetermined quality.

(9) The analysis unit may be configured to calculate an index value of the quality of the product to be produced, based on whether the element value is included in the allowable range of each item.

(10) The plurality of element values may include at least two of an element value of an item relating to a raw material of the product, an element value of an item relating to a production process of the product, an element value of an item relating to a production facility of the product, and an element value of an item relating to a person relating to production of the product.

(11) A production support method that relates to one or more embodiments of the present invention and is to be performed in a production support system configured to process a raw material and to produce a product includes: acquiring a plurality of element values relating to production elements of the product; determining whether the element values are within allowable ranges in which a quality of the product meets a predetermined allowed quality; resetting the allowable ranges of one or a plurality of other element values to the allowable ranges in which the quality of the product meets the predetermined quality, when it is determined that at least one element value exceeds the allowable range; and outputting information about the reset allowable ranges.

(12) A computer-readable non-transitory storage medium that relates to one or more embodiments of the present invention and stores a program for causing a computer to execute a process includes: acquiring a plurality of element values relating to production elements of the product; determining whether the element values are within allowable ranges in which a quality of the product meets a predetermined allowed quality; resetting the allowable ranges of one or a plurality of other element values to the allowable ranges in which the quality of the product meets the predetermined quality, when it is determined that at least one element value exceeds the allowable range; and outputting information about the reset allowable ranges.

According to one or more embodiments, even when the element value indicative of the characteristic of the production element exceeds the allowable range in which the quality of the product meets the predetermined quality, it is possible to support so that the quality of the product meets the predetermined quality without being contradictory to improvement on a management index.

That is, according to one or more embodiments, when any one of the element values indicating the respective characteristics of a raw material, a facility, a process and a person as production elements exceeds the predetermined allowable range, the information about the allowable ranges of the one or the plurality of element values to be reset so that the quality of the product meets the predetermined quality is provided.

Also, according to one or more embodiments, the relative values from the predetermined standard values of the plurality of respective element values at that point in time are generalized, so that an index value quantifying the quality of the product is provided.

Also, according to one or more embodiments, when the element value exceeding the allowable range in which the predetermined quality is satisfied occurs, a user is provided with the information indicative of the event that is a cause of generating the element value exceeding the allowable range, the event that is caused when the element value exceeds the allowable range or the countermeasure to ensure that the quality of the product meets the predetermined quality.

Also, according to one or more embodiments, when the element value exceeding the allowable range in which the predetermined quality is satisfied occurs, the information indicative of the countermeasure to ensure that the quality of the product meets the predetermined quality is provided to a control target device.

Therefore, the user is urged to perform an action for ensuring that the quality of the product meets the predetermined quality by adjusting the element values indicative of the production elements before the shipment of the product.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A production support system that processes a raw material and produces a product, the production support system comprising:
    a memory; and
    a processor coupled to the memory and that:
        acquires a plurality of element values relating to production elements of the product;
        determines whether the plurality of element values are within allowable ranges in which a quality of the product meets a predetermined allowed quality;
        upon determining that at least one element value of the plurality of element values exceeds the allowable range, resets the allowable ranges of one or a plurality of other element values of the plurality of element values to new allowable ranges in which a quality of the product meets the predetermined allowed quality; and
        outputs information about the reset allowable ranges, wherein
    the memory stores:
        an item of which an element value of the plurality of element values exceeds an allowable range; and
        notification information that indicates an event that causes the element value to exceed the allowable range,
    the item is associated with the notification information in the memory,
    the processor outputs the notification information associated with the item of at least one element value of the plurality of element values determined to have exceeded the allowable range,
    the processor further specifies, as a cause item relating to a cause of excess of the allowable range, another item that is separate from an analysis item and has a difference with respect to a representative value of element values between:
        a first set consisting of first samples that are samples consisting of element values of a plurality of items with which a quality of the product meets the predetermined quality, and in which an element value of the analysis item is within a predetermined value range, and
        a second set consisting of second samples that are samples consisting of element values of a plurality of items with which a quality of the product does not meet the predetermined quality, and in which an element value of the analysis item is within the predetermined value range,
    the processor further determines, as a countermeasure, processing of approximating a representative value of the element value of the cause item in the second set to a representative value of the element value of the cause item in the first set,
    the plurality of element values include at least two different types of element values selected from a group consisting of the following types:
        (i) a first element value of an item relating to a raw material of the product, (ii) a second element value of an item relating to a production process of the product, (iii) a third element value of an item relating to a production facility of the product, and (iv) a fourth element value of an item relating to a person relating to production of the product, and the processor further calculates an index value of a quality of the product to be produced, based on whether each of the plurality of element values is included in the allowable range of each item.

2. The production support system according to claim 1, wherein the outputting of information includes generating display data for displaying the allowable ranges of the one or the plurality of other element values.

3. The production support system according to claim 2, wherein the display data is data indicative of a radar chart showing the one or the plurality of other element values and the allowable ranges.

4. The production support system according to claim 1, wherein the memory stores operation information indicative of execution of the countermeasure to ensure that the quality of the product meets the predetermined quality, the operation information and the item of which the element value exceeds the allowable range are stored in the memory in association with each other, and the outputting of information includes outputting the operation information that is stored in the memory and is associated with the item of the element value determined to have exceeded the allowable range.

5. The production support system according to claim 1, wherein the memory stores operation information indicative of execution of the countermeasure to ensure that the quality of the product meets the predetermined quality, the operation information and the item of which the element value exceeds the allowable range are stored in the memory in association with each other, and the outputting of information includes:

generating a command for controlling a target device from the operation information that is stored in the memory and is associated with the item of the element value determined to have exceeded the allowable range; and transmitting the command to the target device.

6. The production support system according to claim 1, wherein the processor further calculates a parameter of a function for calculating the allowable ranges of the one or the plurality of other element values from the at least one element value, based on quality information indicating whether the quality of the product to be produced under the plurality of element values meets the predetermined quality.

7. The production support system according to claim 1, wherein, wherein the representative value of the element value of the cause item is a mean value of the element value of the cause item.

8. A method to be performed in a production support system that processes a raw material and to produce a product, the method comprising:

acquiring a plurality of element values relating to production elements of the product;

determining whether the plurality of element values are within allowable ranges in which a quality of the product meets a predetermined allowed quality;

upon determining at least one element value of the plurality of element values exceeds the allowable range, resetting the allowable ranges of one or a plurality of other element values of the plurality of element values to new allowable ranges in which the quality of the product meets the predetermined allowed quality;

outputting information about the reset allowable ranges; and storing:

an item of which an element value of the plurality of element values exceeds an allowable range; and notification information that indicates an event that causes the element value of the plurality of element values to exceed the allowable range, wherein the item is associated with the notification information in a memory, the outputting outputs the notification information associated with the item of the at least one element value of the plurality of element values determined to exceeded the allowable range, the method further comprising:

specifying, as a cause item relating to a cause of excess of the allowable range, another item that is separate from an analysis item and has a difference with respect to a representative value of element values between:

a first set consisting of first samples that are samples consisting of element values of a plurality of items with which a quality of the product meets the predetermined quality, and in which an element value of the analysis item is within a predetermined value range, and a second set consisting of second samples that are samples consisting of element values of a plurality of items with which a quality of the product does not meet the predetermined quality, and in which an element value of the analysis item is within the predetermined value range; and determining, as a countermeasure, processing of approximating a representative value of the element value of the cause item in the second set to a representative value of the element value of the cause item in the first set, the plurality of element values include at least two different types of element values selected from a group consisting of the following types:

(i) a first element value of an item relating to a raw material of the product, (ii) a second element value of an item relating to a production process of the product, (iii) a third element value of an item relating to a production facility of the product, and (iv) a fourth element value of an item relating to a person relating to production of the product, and the method further comprising: calculating an index value of a quality of the product to be produced, based on whether each of the plurality of element values is included in the allowable range of each item.

9. A non-transitory computer-readable medium (CRM) that stores a program that causes a computer to execute a process, the process comprising causing the computer to:

acquire a plurality of element values relating to production elements of the product;

determine whether the plurality of element values are within allowable ranges in which a quality of the product meets a predetermined allowed quality;

upon determining that at least one element value of the plurality of element values exceeds the allowable range, reset the allowable ranges of one or a plurality of other element values of the plurality of element values to new allowable ranges in which a quality of the product meets the predetermined allowed quality;

cause a display to display information about the reset allowable ranges; and store:
- an item of which an element value of the plurality of element values exceeds an allowable range; and
- notification information that indicates an event that causes the element value of the plurality of element values to exceed the allowable range, wherein the item is associated with the notification information, the displayed information is the notification information associated with the item of the at least one element value determined to have exceeded the allowable range, the process further comprising causing the computer to:
- specify, as a cause item relating to a cause of excess of the allowable range, another item that is separate from an analysis item and has a difference with respect to a representative value of element values between:
  - a first set consisting of first samples that are samples consisting of element values of a plurality of items with which a quality of the product meets the predetermined quality, and in which an element value of the analysis item is within a predetermined value range, and
  - a second set consisting of second samples that are samples consisting of element values of a plurality of items with which a quality of the product does not meet the predetermined quality, and in which an element value of the analysis item is within the predetermined value range; and
- determine, as a countermeasure, processing of approximating a representative value of the element value of the cause item in the second set to a representative value of the element value of the cause item in the first set, the plurality of element values include at least two different types of element values selected from a group consisting of the following types:
(i) a first element value of an item relating to a raw material of the product,
(ii) a second element value of an item relating to a production process of the product,
(iii) a third element value of an item relating to a production facility of the product, and
(iv) a fourth element value of an item relating to a person relating to production of the product, and the process further comprising causing the computer to calculate an index value of the quality of the product to be produced, based on whether each of the plurality of element values is included in the allowable range of each item.

* * * * *